(12) United States Patent
Takeuchi et al.

(10) Patent No.: US 7,126,897 B2
(45) Date of Patent: Oct. 24, 2006

(54) MULTI-LEVEL INFORMATION RECORDING APPARATUS, MULTI-LEVEL INFORMATION RECORDING METHOD, MULTI-LEVEL INFORMATION RECORDING MEDIUM AND MULTI-LEVEL INFORMATION RECORDING-REPRODUCING APPARATUS

(75) Inventors: Kohji Takeuchi, Kanagawa (JP); Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 523 days.

(21) Appl. No.: 10/386,532

(22) Filed: Mar. 13, 2003

(65) Prior Publication Data

US 2004/0027958 A1 Feb. 12, 2004

(30) Foreign Application Priority Data

| Mar. 18, 2002 | (JP) | 2002-073599 |
| Apr. 15, 2002 | (JP) | 2002-112454 |
| Aug. 27, 2002 | (JP) | 2002-246782 |
| Oct. 22, 2002 | (JP) | 2002-307327 |
| Nov. 8, 2002 | (JP) | 2002-326125 |
| Dec. 25, 2002 | (JP) | 2002-374265 |
| Dec. 26, 2002 | (JP) | 2002-377213 |

(51) Int. Cl.
*G11B 5/09* (2006.01)
*G11B 10/10* (2006.01)

(52) U.S. Cl. .................. 369/47.53; 369/59.11
(58) Field of Classification Search ............ None
See application file for complete search history.

(56) References Cited

U.S. PATENT DOCUMENTS

| 5,220,556 | A | 6/1993 | Shimizu |
| 5,344,683 | A | 9/1994 | Shimizu |
| 5,638,354 | A | 6/1997 | Nakayama et al. |
| 5,737,307 | A | 4/1998 | Shimizu |
| 5,812,520 | A | 9/1998 | Nakayama et al. |
| 5,822,286 | A | 10/1998 | Nakayama et al. |
| 5,926,446 | A | 7/1999 | Shimizu |
| 6,127,100 | A | 10/2000 | Shimizu |
| 6,487,149 | B1 | 11/2002 | Yokoi et al. |
| 6,608,807 | B1 * | 8/2003 | Lee ................... 369/59.26 |
| 6,940,790 | B1 * | 9/2005 | Powelson et al. ...... 369/47.15 |
| 2001/0038583 | A1 * | 11/2001 | Miyagawa et al. ...... 369/47.17 |
| 2002/0021643 | A1 | 2/2002 | Miura et al. |
| 2002/0036978 | A1 | 3/2002 | Shimizu |
| 2002/0071380 | A1 | 6/2002 | Shimizu |

(Continued)

FOREIGN PATENT DOCUMENTS

JP      10-134353      5/1998

(Continued)

*Primary Examiner*—Thang V. Tran
*Assistant Examiner*—Tawfik Goma
(74) *Attorney, Agent, or Firm*—Dickstein Shapiro LLP

(57) ABSTRACT

A multi-level information recording-reproducing apparatus can accurately determine multi-level information even if recording density is increased. A multi-level information recording-reproducing apparatus radiates a laser beam to an information recording medium by switching a radiation energy level of the laser beam in a multi-level fashion and records a recorded mark in the information recording medium. The multi-level information recording-reproducing apparatus reproduces a multi-level data sequence recorded as a test pattern in the information recording medium, sets a reproduction signal level of a recorded mark based on an immediately-before cell located immediately before a cell to be reproduced, and corrects the radiation energy level of the laser beam so that the reproduction signal level can have a separate distribution from a distribution of another reproduction signal level.

4 Claims, 24 Drawing Sheets

U.S. PATENT DOCUMENTS

| | | |
|---|---|---|
| 2003/0030719 A1 | 2/2003 | Shimizu |
| 2003/0110444 A1 | 6/2003 | Sakagami et al. |
| 2003/0112667 A1 | 6/2003 | Shimizu et al. |

FOREIGN PATENT DOCUMENTS

| | | |
|---|---|---|
| JP | 2001-84591 | 3/2001 |
| JP | 2001-84592 | 3/2001 |
| JP | 2001-084592 | 3/2001 |
| WO | WO 01/57856 A1 | 8/2001 |
| WO | WO-01/57856 A1 | 8/2001 |

* cited by examiner

FIG.30

| No | IMMEDIATELY-BEFORE | CELL TO BE DETERMINED | IMMEDIATELY-AFTER | T1 | T2 | T3 | S(LMN) | S0(LMx) |
|---|---|---|---|---|---|---|---|---|
| 1 | 0 | 0 | 0 | T1(000) | T2(000) | T3(000) | S(000) | S0(00X) |
| 2 | 0 | 0 | 1 | T1(001) | T2(001) | T3(001) | S(001) | S0(00X) |
| . | . | . | . | . | . | . | . | . |
| . | . | . | . | . | . | . | . | . |
| 512 | 7 | 7 | 7 | T1(777) | T2(777) | T3(777) | S(777) | S0(77X) |

MULTI-LEVEL INFORMATION RECORDING APPARATUS, MULTI-LEVEL INFORMATION RECORDING METHOD, MULTI-LEVEL INFORMATION RECORDING MEDIUM AND MULTI-LEVEL INFORMATION RECORDING-REPRODUCING APPARATUS

BACKGROUND OF THE INVENTION

1. Field of the Invention

The present invention generally relates to a multi-level information recording apparatus, a multi-level information recording method and a multi-level information recording medium for using multi-level recording techniques to record information in an information recording medium such as an optical disk and a multi-level information recording-reproducing apparatus for using the multi-level recording techniques to record and reproduce information in an information recording medium such as an optical disk, and more particularly to a multi-level recording apparatus, a multi-level recording method, a multi-level recording medium and a multi-level recording-reproducing apparatus that can determine a multi-level with accuracy even if a recording density is increased.

2. Description of the Related Art

Recent development of computer-related arts and information technologies has accelerated a movement to digitize various types of information such as image information and audio information. In fact, such image information and such audio information are widely distributed as digital information at present. In this circumstance, the larger amount of contents digital information has, the higher recording density an information recording medium for recording the digital information such as an optical disk is required to have. There are various types of optical disks, for instance, CD (Compact Disk), CD-R (Compact Disk Recordable), CR-ROM (Compact Disk Read Only Memory), DVD (Digital Versatile Disk) and so on. In a recordable and readable recording medium such as CD-R and DVD-RAM (Digital Versatile Disk Random Access Memory), information is recorded therein as binary information, that is, 2-level information. In order to increase the recording density along this approach, some conventional methods intend to reduce the pit size of an optical disk or form smaller recorded marks on an optical disk. However, a recording-readable apparatus has limits on wavelength of an illuminant thereof and NA (Numerical Aperture) of an objective lens thereof. Consequently, there are limits on the sizes of pits and recorded marks.

There is another approach for increasing storage capacity of an optical disk without changing the numbers of illuminants and NA of an objective lens. Multi-level information recording methods have been presented in some conferences such as ODS (Optical Data Storage) along this approach. In these multi-level information recording methods, information is recorded as multi-level information, that is, as more than or equal to three-level information rather than binary information.

However, the multi-level information recording methods have some disadvantages in that the level of a multi-level signal for recording multi-level information, which is referred to as a multi-level, is erroneously determined due to inter-symbol interference from adjacent recorded marks.

Japanese Laid-Open Patent Application No. 2001-084592 discloses a multi-level information recording method that intends to reduce multi-level determination errors due to the inter-symbol interference when multi-level information is reproduced. In this multi-level information recording method, when multi-level information or multi-level data is recorded, the average of adjacent recorded marks of a recorded mark is computed. Then, recording power is corrected in proportion to a difference between the average and the recorded mark. According to the multi-level information recording method, the larger difference between the average and the recorded mark is, the more largely the recording power is corrected. In general, the inter-symbol interference is largely caused in proportion to differences between adjacent recorded marks and the recorded mark to be recorded. Therefore, according to the multi-level information recording method, the correction offsets the inter-symbol interference.

However, the above-mentioned multi-level information recording method has some cases where the recording power cannot be successfully corrected.

A description will now be given, with reference to FIG. 1, of the problem on the above-mentioned multi-level information recording method wherein multi-level information is recorded as 8-level information. FIG. 1 shows an observation result of recorded marks according to the 8-level information recording method in a case where a multi-level data sequence "0, 1, 7, 1, 0" is recorded in a phase-change optical disk.

In the conventional 8-level information recording method, it is supposed that each multi-level data "0", "1", "7", "1" and "0" of the multi-level data sequence "0, 1, 7, 1, 0" are recorded in individual cells Se of a track Tr of the phase change optical disk. Regarding a first pattern "0, 1, 7" and a second subsequence "7, 1, 0", the conventional multi-level information recording method assigns same recording power to the both multi-level data "1"s because the two multi-level data "1"s are in the same condition according to the conventional multi-level information recording method. As is shown in the observation result in FIG. 1, however, the multi-level data "1" and "7" of the first pattern are properly recorded as the recorded marks "m1" and "m7", respectively, in the cells Se whereas the multi-level data "1" of the second pattern are not successfully recorded as the recorded mark "m" in the cell Se. Through similar experiments on other multi-level data patterns, it is observed that formation of a recorded mark often ends in failure if the recorded mark is located immediately behind a long recorded mark having a higher level than 5-level data in the 8-level information recording.

The above-mentioned problem is mainly caused in the following reason. FIGS. 2A and 2B show waveform diagrams of variations of the recording power under the conventional multi-level information recording method with respect to the first pattern and the second pattern, respectively. When the first pattern is recorded, a laser beam is radiated by varying the recording power or the laser power as radiation energy of the laser beam in a multi-level fashion in accordance with the waveform as shown in FIG. 2A. Similarly, when the second pattern is recorded, a laser beam is radiated by varying the laser power in accordance with the waveform as shown in FIG. 2B.

As is shown in FIG. 3, there are three levels of recording pulses, write power Pw (a top pulse), bias power Pb (a cooling pulse) and erase power Pe (an erase pulse).

When the multi-level data "1" are recorded for the second pattern "7, 1, 0", a cumulative amount of the laser beam corresponds to the shaded portion shown in FIG. 2B. At this time, the laser beam has the cumulative amount smaller than that of the first pattern with respect to the erase power Pe by the range X shown in FIG. 2B. As a result, the laser beam cannot sufficiently increase the temperature of a recording layer of an information recording medium, and a recorded mark for the multi-level data "1" is not successfully formed.

A detailed description will now be given, with reference to FIGS. 4A and 4B, of 4-level distributions before and after the recording power correction, respectively, according to the above-mentioned conventional multi-level information recording method.

FIG. 4A shows four multi-level distributions before the recording power correction according to the above-mentioned conventional multi-level information recording method. As is shown in FIG. 4A, the multi-level distributions have overlapped areas in the bottom between adjacent multi-level distributions due to inter-symbol interference. When the amplitude of reproduction signals varies in the overlapped areas, the multi-level is erroneously determined, that is, a determination error occurs. If the recording power is corrected in consideration of such amplitude variations of the reproduction signal so that the inter-symbol interference can be offset, deviations of the multi-level distributions becomes smaller as shown in FIG. 4B. As a result, it is possible to suppress the determination errors.

However, if the recording density is further to be increased, the above-mentioned conventional recording power correction method has difficulty of the accurate multi-level determination. The difficulty is explained in detail with reference to FIGS. 5A and 5B in the case where 4-level information is recorded.

FIG. 5A is a plan view of a groove where recorded marks are formed for a 4-level data sequence "3, 0, 3", and FIG. 5B is a-diagram illustrating an RF (Radio Frequency) signal for forming the recorded marks.

Here, the recording power is set such that no recorded mark can be formed for the multi level 0 (Lv0). The recording power is set for the multi-level 0 so as to offset the inter-symbol interference. In this recording power correction, a reference signal level for the 4-level information recording power correction is set as the maximum signal level of the inter-symbol interference, that is, the signal level in the case where the multi level 0 is recorded between the multi levels 3.

Therefore, a threshold of the multi-level determination is determined by dividing a difference DR' between the multi level Lv0 and the multi level Lv3 by 3. It is noted that the difference DR' is smaller than a difference DR between the groove level GL and the multi level Lv3. If the interval between recorded marks is narrowed in the conventional multi-level information recording method so as to increase the recording density, the difference DR' becomes smaller due to greater influence by the inter-symbol interference. In this case, since the level determination threshold has a shorter interval, the differences between multi-levels decrease and the margins become smaller. As a result, the multi-level determination becomes less accurate, that is, there is higher probability that the determination error occurs. As the number of multi-levels increases, the margins become smaller. Therefore, this problem becomes more serious.

In order to overcome the above-mentioned problem, a multi-level information recording method according to the present invention mainly intends to properly form a recorded mark in an information recording medium even if multi-level data are recorded in high density.

Furthermore, the multi-level information recording method intends to achieve other purposes. When recorded multi-level data are reproduced, a conventional multi-level recording method performs the following signal processing for removing inter-symbol interference.

FIG. 6 shows an example of recorded marks formed in a predetermined interval between adjacent recorded marks in a case where multi-level data "l", "m" and "n" are recorded in the (i−1)-st cell through (i+1)-st cell in a track Tr, respectively. FIG. 7 shows waveforms before and after a waveform equalizing process for a reproduction signal of the recorded marks in FIG. 6. When the track Tr is played back, a reproduction signal s(i) of an i-th cell is supplied to a waveform equalizer as shown in FIG. 7. The waveform equalizer performs an operation based on the following equation (1) for the reproduction signal s(i), $$EQ(i|l, m, n) = C1\{s(i)-s(i-1)\}+s(i)+C2\{s(i)-s(i+1)\} \qquad (1),$$

where C1 and C2 are waveform equalizing coefficients. Then, the waveform equalizer outputs the waveform-equalized signal EQ(i|l, m, n). For instance, when a track including multi-level data "m" in the (i−1)-st cell through (i+1)-st cell is played back, the waveform equalizer outputs the waveform equalized signal $$EQ(i|m, m, m) = s(i) \qquad (2),$$

because the equations s(i)=s(i−1)=s(i+1) are satisfied for the equation (1) in this case.

In the equation (1), the waveform equalizing coefficients C1 and C2 are set so that the following formula $$\sum_{l,m,n=0}^{7} \{EQ(i|l, m, n) - EQ(i|m, m, m)\}^2 \qquad (3)$$

can have the minimal value for all combinations of three 8-level data. If m-level information is recorded, the formula (3) is computed for all $m^3$ combinations of m multi-level data. According to the above-mentioned waveform equalizing process, even if a reproduction signal has a waveform without sharpness due to the inter-symbol interference, it is possible to produce a sharp waveform signal by performing the waveform equalizing process.

However, there is a combination such that the equation EQ(i|l, m, n)=EQ(i|m, m, m) is not satisfied, because a recorded mark is not formed in a predetermined size due to thermal interference generated at recording time. In order to correct this problem, laser energy is adjusted for each combination of multi-level data.

A degree of the inter-symbol interference varies depending on the recording density, a shape of a laser beam and a type of an information recording media. In some cases, the above-mentioned conventional multi-level information recording method cannot properly correct the laser energy by simply using the difference between recorded multi-level data and the average of adjacent multi-level data.

In addition, since the conventional multi-level information recording method does not determine whether or not the recording power correction has succeeded, it is impossible to obtain certainty regarding appropriate reproduction of recorded multi-level data. Furthermore, while the correction is adjusted based on a recorded multi-level data sequence, it is determined whether or not recorded multi-level data are properly played back based on a reproduction signal. Thus, the recording power correction should be performed based on the reproduction signal rather than the recorded multi-level data sequence.

Accordingly, a multi-level information recording method according to the present invention further intends to achieve the following purposes. The first purpose is to provide a multi-level information recording method that can determine an optimal level of the laser energy with respect to combinations of multi-level data as small iteration times, that is, less computation as possible. The second purpose is to provide a multi-level information recording method that can prepare test patterns for determining laser energy corresponding to the combinations of multi-level data. The third purpose is to provide a multi-level information recording method that includes a laser energy setting method. The fourth purpose is to provide a multi-level information recording method that can easily control laser energy. The fifth purpose is to provide a multi-level information recording method that has broader tolerance with respect to multi-level data determination errors. The sixth purpose is to provide a multi-level information recording medium suitable to the multi-level information recording method according to the present invention. The seventh purpose is to provide a multi-level information recording-reproducing apparatus that can determine an optimal level of the laser energy with respect to combinations of multi-level data as smaller iteration times, that is, less computation as possible.

SUMMARY OF THE INVENTION

It is a general object of the present invention to provide a multi-level information recording apparatus, a multi-level information recording method, a multi-level information recording medium and a multi-level recording-reproducing apparatus in which the above-mentioned problems are eliminated.

A more specific object of the present invention is to provide a multi-level information recording apparatus, a multi-level information recording method, a multi-level information recording medium and a multi-level recording-reproducing apparatus that can reduce determination error and determine a multi-level with high accuracy even if the recording density is increased.

In order to achieve the above-mentioned objects, there is provided according to one aspect of the present invention a multi-level information recording apparatus for radiating a laser beam to an information recording medium by switching a radiation energy level of the laser beam in a multi-level fashion in accordance with a multi-level data sequence formed of a plurality of multi-level data and recording a recorded mark corresponding to the multi-level data sequence in an individual cell of the information recording medium, comprising: a correction part reproducing a multi-level data sequence recorded as a test pattern in the information recording medium, setting a reproduction signal level of a recorded mark in a cell to be reproduced for each multi-level data of a recorded mark in an immediately-before cell located immediately before the cell to be reproduced, of a recorded mark in an immediately-after cell located immediately after the cell to be reproduced, or of recorded marks in both the immediately-before cell and the immediately-after cell, and correcting the radiation energy level of the laser beam so that the reproduction signal level can have a separate distribution from a distribution of another reproduction signal level.

Additionally, there is provided according to another aspect of the present invention a multi-level information recording method for radiating a laser beam to an information recording medium by switching a, radiation energy level of the laser beam in a multi-level fashion in accordance with a multi-level data sequence formed of a plurality of multi-level data and recording a recorded mark corresponding to the multi-level data sequence in an individual cell of the information recording medium, comprising the steps of: reproducing a multi-level data sequence recorded as a test pattern in the information recording medium; setting a reproduction signal level of a recorded mark in a cell to be reproduced for each multi-level data of a recorded mark in an immediately-before cell located immediately before the cell to be reproduced, of a recorded mark in an immediately-after cell located immediately after the cell to be reproduced, or of recorded marks in both the immediately-before cell and the immediately-after cell; and correcting the radiation energy level of the laser beam so that the reproduction signal level can have a separate distribution from a distribution of another reproduction signal level.

In the above-mentioned invention, the multi-level data sequence may be formed of three multi-level data each of which is recorded in a cell to be recorded, an immediately-before cell located immediately before the cell to be recorded, and an immediately-after cell located immediately after the cell to be recorded.

In the above-mentioned invention, the multi-level data may be one of m values: $0, 1, 2, \ldots, (m-1)$ where m is a positive integer and $m \geq 1$, and when the immediately-before cell has multi-level data n satisfying an inequality $n > (m-1)/2$, a radiation energy level of a laser beam for recording the multi-level data in the cell to be recorded may be corrected by increasing the radiation energy level.

In the above-mentioned invention, the radiation energy level of the laser beam may be corrected based on one of power of the laser beam, a radiation timing of the laser beam and a radiation time period of the laser beam, and a combination of the power, the radiation timing and the radiation time period.

In the above-mentioned invention, the radiation energy level of the laser beam may be corrected so that a reproduction signal level can have an approximately equal interval for each multi-level data of the recorded mark in the immediately-before cell, of the recorded mark in the immediately-after cell, or of the recorded marks in both the immediately-before cell and the immediately-after cell.

In the above-mentioned invention, the radiation energy level of the laser beam may be corrected so that a reproduction signal level can have an interval corresponding to a deviation of the reproduction signal level of the multi-level data for each multi-level data of the recorded mark in the immediately-before cell, of the recorded mark in the immediately-after cell, or of the recorded marks in both the immediately-before cell and the immediately-after cell.

In the above-mentioned invention, the radiation energy level corrected and a correction amount may be recorded in one of the information recording medium and a memory part thereof.

In the above-mentioned invention, the recorded mark may be recorded in the information recording medium based on the radiation energy level corrected and the correction amount recorded in the information recording medium in advance.

In the above-mentioned invention, the radiation energy level corrected and the correction amount may be recorded in an area other than a user data record area in the information recording medium.

In the above-mentioned invention, the information recording medium may be a phase-change optical recording medium.

Additionally, there is provided according to another aspect of the present invention a multi-level information recording medium for recording a recorded mark in an individual cell therein so that a reproduction signal level of the recorded mark can vary in a multi-level fashion in accordance with a multi-level data sequence formed of a plurality of multi-level data, comprising: a storage part, when a reproduction signal level of a recorded mark in a cell to be reproduced is set for each multi-level data of a recorded mark in an immediately-before cell located immediately before the cell to be reproduced, of a recorded mark in an immediately-after cell located immediately after the cell to be reproduced, or of recorded marks in both the immediately-before cell and the immediately-after cell, recording the recorded mark in a shape corrected so that the reproduction signal level can have a separate distribution from a distribution of another reproduction signal level.

In the above-mentioned invention, the shape may be corrected based on an area of the recorded mark, a position thereof, a depth thereof, or a combination of the area, the position and the depth.

According to the above-mentioned inventions, radiation energy of a laser beam is corrected in accordance with a multi-level data sequence so as to separate reproduction signal levels of a cell to be reproduced, the immediately-before cell, and the immediately-after cell.

Additionally, it is possible to reduce the multi-level data determination error.

Additionally, since the optical disk recording method corrects the laser beam radiation energy by one unit of three multi-level data, it is possible to set an amount of correction separately with respect to all combinations of three multi-level data.

Additionally, when the inequality n>(m−1)/2 is satisfied for the multi-level data "n" in the immediately-before cell, the multi-level information recording method corrects the laser beam radiation energy by increasing the energy level. As a result, it is possible to sufficiently heat the recording film of an information recording medium and form a stable recorded mark.

Additionally, it is possible to correct the laser beam radiation energy so that the interval between a cell to be reproduced and the immediately-before cell, or interval between a cell to be reproduced and the immediately-after cell, or intervals between a cell to be reproduced and the immediately-before cell and the immediately-after cell can become approximately equal with reference to the immediately-before cell and the immediately-after cell. As a result, it is possible to reduce the multi-level data determination error.

Additionally, it is possible to correct the laser beam radiation energy so that the interval between a cell to be reproduced and the immediately-before cell, or interval between a cell to be reproduced and the immediately-after cell, or intervals between a cell to be reproduced and the immediately-before cell and the immediately-after cell can correspond to differences of reproduction signal levels with reference to the immediately-before cell and the immediately-after cell. As a result, it is possible to reduce the multi-level data determination error.

Additionally, since laser beam radiation energy corresponding to the optimal multi-level data sequence is recorded in an information recording medium or an information recording apparatus, it is unnecessary to optimize the radiation energy for each recording operation. As a result, it is possible to efficiently record information.

Additionally, if laser beam radiation energy corresponding to the optimal multi-level data sequence is recorded in an information recording medium or an optical disk recording-reproducing apparatus and multi-level information is recorded cased on the radiation energy, it is unnecessary to optimize the radiation energy for each recording operation. As a result, it is possible to efficiently record information.

Additionally, if laser beam radiation energy and correction amount are recorded in an area other than a user data area, it is possible to efficiently optimize the radiation energy without the loss of the capacity of the user data area.

Additionally, if a phase-change recording material is used as an information recording medium of the optical disk recording-reproducing apparatus, it is possible to control shapes of recorded marks with high accuracy.

Additionally, if the optical disk recording-reproducing apparatus corrects shapes of recorded marks so that the reproduction signal level of a cell to be reproduced can be separated from those of the immediately-before cell and the immediately-after cell, it is possible to reduce the multi-level data determination error.

Additionally, if recorded mark configuration is corrected in accordance with the pit area, the pit depth and the pit position, it is possible to control the reproduction signal level with high accuracy.

Additionally, there is provided according to another aspect of the present invention a multi-level information recording method for radiating a laser beam in an information recording medium and recording multi-level data in the information recording medium wherein a radiation energy level of the laser beam is controlled in accordance with the multi-level data, comprising the steps of: recording a known multi-level data sequence by using the laser beam of a radiation energy level corresponding to a combination of multi-level data and obtaining a reproduction result for the combination; performing a waveform equalizing process for the reproduction result; computing a target signal level for each combination of the multi-level data by using a waveform equalizing coefficient; computing a difference between the target signal level and a value obtained by performing the waveform equalizing process; determining a correction amount of the laser beam for each combination of the multi-level data in accordance with the waveform equalizing coefficient and the difference; and determining a correction amount of the laser beam corresponding to the combination of the multi-level data.

In the above-mentioned invention, the waveform equalizing process may be performed based on a formula (1), and the correction amount of the laser beam may be determined based on a formula (2), $$EQ'(i) = s'(i) + \sum_{j=-h}^{h} Cj\{s'(i) - s'(i+j)\}, \quad (1)$$

and $$\Delta E(i) = \frac{\beta \cdot \Delta(i)(1 + \sum_{j=-h}^{h} Cj)}{(1 + 2\sum_{j=-h}^{h} |Cj|) \cdot \frac{ds'(i)}{dE(i)}}, \quad (2)$$

where the number of taps of a waveform equalizer is 2h+1, EQ'(i) is a signal level after the waveform equalizing process, s'(i) is a reproduction signal level of i-th multi-level data, Cj is a waveform equalizing coefficient (j=−h, −(h−1), . . . , −1, 0, 1, . . . , h−1, h), β is a correction coefficient, Δ(i) is a difference between a target signal level and a result of the waveform equalizing process, and ds'(i)/dE(i) is a gradient of a curve of a reproduction signal level s'(i) to a laser beam energy E(i).

In the above-mentioned invention, the waveform equalizing process may be performed based on a formula (3), and the correction amount of the laser beam may be determined based on a formula (4), $$EQ'(i) = s'(i) + \sum_{j=-h}^{h} Cj\{s'(i) - s'(i+j)\}, \quad (3)$$

and $$\Delta E(i) = \frac{\beta[1 + \sum_{j=-h}^{h} Cj\{\Delta(i) + \Delta(i+j)\}]}{(1 + 2\sum_{j=-h}^{h} |Cj|) \cdot \frac{ds'(i)}{dE(i)}}, \quad (4)$$

where the number of taps of a waveform equalizer is 2h+1, EQ'(i) is a signal level after the waveform equalizing process, s'(i) is a reproduction signal level of i-th multi-level data, Cj is a waveform equalizing coefficient (j=−h, −(h−1), . . . , −1, 0, 1, . . . , h−1, h), β is a correction coefficient, Δ(i) is a difference between a target signal level and a result of the waveform equalizing process, and ds'(i)/dE(i) is a gradient of a curve of a reproduction signal level s'(i) to a laser beam energy E(i).

In the above-mentioned invention, the known multi-level data sequence may include all combinations formed of at least three multi-level data.

In the above-mentioned invention, the correction coefficient β may be determined as a value x that maximizes a formula (5), $$\Sigma\Delta^2(\beta=x|i) - \Sigma\Delta^2(\beta=0|i) \quad (5),$$

where $\Sigma\Delta^2(\beta=0|i)$ is a sum of squares of differences between target signal levels and reproduction signal levels under initial radiation levels of the laser beam, and $\Sigma\Delta^2(\beta=x|i)$ a sum of squares of differences between target signal levels and reproduction signal levels after the initial radiation levels of the laser beam are updated once in a condition where β=x.

In the above-mentioned invention, the correction coefficient β may be determined as a value x that maximizes a formula (6), $$\Sigma\Delta^2(\beta=x|i) - \Sigma\Delta^2(\beta=0|i) \quad (6),$$

where $\Sigma\Delta^2(\beta=0|i)$ is a sum of squares of differences between target signal levels and reproduction signal levels under initial radiation levels of the laser beam, and $\Sigma\Delta^2(\beta=x|i)$ a sum of squares of differences between target signal levels and reproduction signal levels after the initial radiation levels of the laser beam are updated once in a condition where β=x.

In the above-mentioned invention, the radiation energy level of the laser beam may be determined corresponding to a combination formed of at least three multi-level data.

In the above-mentioned invention, the radiation energy level of the laser beam may be one or a combination of recording power, erasing power, bias power, a radiation time period of the laser beam and a radiation timing of the laser beam.

In the above-mentioned invention, the radiation energy level of the laser beam may have an initial value determined through a step of determining the initial value so that each interval between adjacent reproduction signal levels can be approximately equal when more than or equal to three-multi-level data are consecutively recorded, a step of detecting a peak of a reproduction signal waveform at a desired timing when one piece of inter-symbol interference-free multi-level data is recorded, and a step of determining the initial value so that an amplitude center of a first reproduction signal waveform can be approximately identical to an amplitude center of a second reproduction signal waveform, the first reproduction signal waveform recorded in a case where multi-level data m and n are alternately repeated and the second reproduction signal waveform recorded in a case where each of the multi-level data m and n is consecutively recorded more than or equal to three times.

In the above-mentioned invention, the interval between adjacent reproduction signal levels may be set based on deviations of distributions of reproduction signal levels.

In the above-mentioned invention, the information recording medium may be a phase-change recording medium.

Additionally, there is provided according to another aspect of the present invention a multi-level information recording-reproducing apparatus for radiating a laser beam in an information recording medium and recording multi-level data in the information recording medium wherein a radiation energy level of the laser beam is controlled in accordance with the multi-level data, comprising: a recording part recording a known multi-level data sequence by using the laser beam of a radiation energy level corresponding to a combination of multi-level data; an obtaining part obtaining a reproduction result for the combination; a performing part performing a waveform equalizing process for the reproduction result; a target signal level computing part computing a target signal level for each combination of the multi-level data by using a waveform equalizing coefficient; a difference computing part computing a difference between the target signal level and a value obtained by performing the waveform equalizing process; and a correction amount determining part determining a correction amount of the laser beam for each combination of the multi-level data in accordance with the waveform equalizing coefficient and the difference.

According to the above-mentioned inventions, the recording correction is performed in accordance with the difference between the target signal level and the reproduction signal level and the waveform equalizing coefficients, it is possible to optimize the laser beam energy for combinations of multi-level data at smaller iteration times.

Additionally, since the recording correction is performed in accordance with the differences between the target signal levels and the reproduction signal levels of adjacent cells and waveform equalizing coefficients, it is possible to optimize the laser beam energy for combinations of multi-level data at smaller iteration times.

Additionally, since a given multi-level data sequence includes at least all combinations of three multi-level data, it is possible to determine the laser beam energy corresponding to all combinations of multi-level data at smaller iteration times.

Additionally, since correction coefficients are determined so that the laser beam energy can have the maximal correction effect, it is possible to optimize the laser beam energy for individual combinations of multi-level data at smaller iteration times.

Additionally, when the laser beam energy is set corresponding to combinations of at least three multi-level data, it is possible to implement the above-mentioned information recording method.

Additionally, since the laser beam energy is controlled based on either or a combination of the recording power, the erasing power, the bias power, the radiation time and the radiation timing of the laser beam, it is possible to easily control the laser beam energy.

Additionally, when the initial laser beam energy is set in the above-mentioned fashion, it is possible to optimize the laser beam energy for all combinations of three multi-level data at smaller iteration times.

Additionally, since intervals between individual reproduction signal levels are arranged based on deviations of the reproduction signal level distributions, it is possible to extend tolerance of the multi-level data determination error.

Additionally, since a phase-change optical disk is used as the information recording medium, it is possible to form recorded marks with high accuracy.

According to the multi-level information recording-reproducing method, since the recording correction is performed in accordance with the difference between the target signal level and the reproduction signal level and the waveform equalizing coefficients, it is possible to optimize the laser beam energy for individual combinations of multi-level data at smaller iteration times.

Additionally, there is provided according to another aspect of the present invention a multi-level information recording method for recording multi-level information in an information recording medium, comprising: a recording step of recording a test pattern of multi-level information; and a determining step of comparing a reproduction signal level of the test pattern with a target signal level and determining a level of radiation energy for each combination of adjacent multi-levels based on a difference between the reproduction signal level and the target signal level, wherein the recording step is repeated until the difference becomes less than a-predetermined value and the level of the radiation energy is corrected so that a deviation of a signal level distribution of each immediately-before multi-level information.

In the above-mentioned invention, the radiation energy of a laser beam may be laser energy and the recording step may increase laser power to a second laser power larger than a first laser power, may decrease the laser power to a third laser power smaller than the first laser power, and may increase the laser power to the first laser power again so as to record the test pattern of the multi-level information, and the radiation energy may be corrected by varying a radiation pattern of the laser beam.

In the above-mentioned invention, the radiation pattern may be controlled by varying the laser power.

In the above-mentioned invention, a ratio of the first laser power to the second laser power may be between about 0.4 and about 0.7.

In the above-mentioned invention, the radiation pattern may be controlled by varying one of an increase timing of the laser power and a decrease timing of the laser power.

Additionally, there is provided according to another aspect of the present invention a multi-level information recording-reproducing apparatus for reproducing multi-level information recorded in an information recording medium, comprising: a recording part recording a test pattern of multi-level information; a determining part determining multi-level from a reproduction signal of the test pattern; an error determining part determining validity of a determination result of the determining part; and a correcting part correcting a radiation energy level of a laser beam based on the validity.

In the above-mentioned invention, the determining part may make a primary determination of multi-level and the reproduction signal level may be classified for each of adjacent multi-levels based on a result of the primary determination so as to finally determine multi-level.

Additionally, there is provided according to another aspect of the present invention a multi-level information recording medium for recording multi-level information therein, comprising: a storage part storing multi-level information as a recorded mark therein, wherein a size of the recorded mark is adjusted in accordance with a size of an adjacent recorded mark.

According to the above-mentioned invention, even if the recording density is increased, it is possible to reduce the determination error and determine multi-level with high accuracy.

Other objects, features and advantages of the present invention will become more apparent from the following detailed description when read in conjunction with the accompanying drawings.

BRIEF DESCRIPTION OF THE DRAWINGS

FIG. 30 is a diagram illustrating recording parameters for 512 combinations of three multi-level data;

DETAILED DESCRIPTION OF THE PREFERRED EMBODIMENTS

In the following, embodiments of the present invention will be described with reference to the accompanying drawings.

Figure 8:
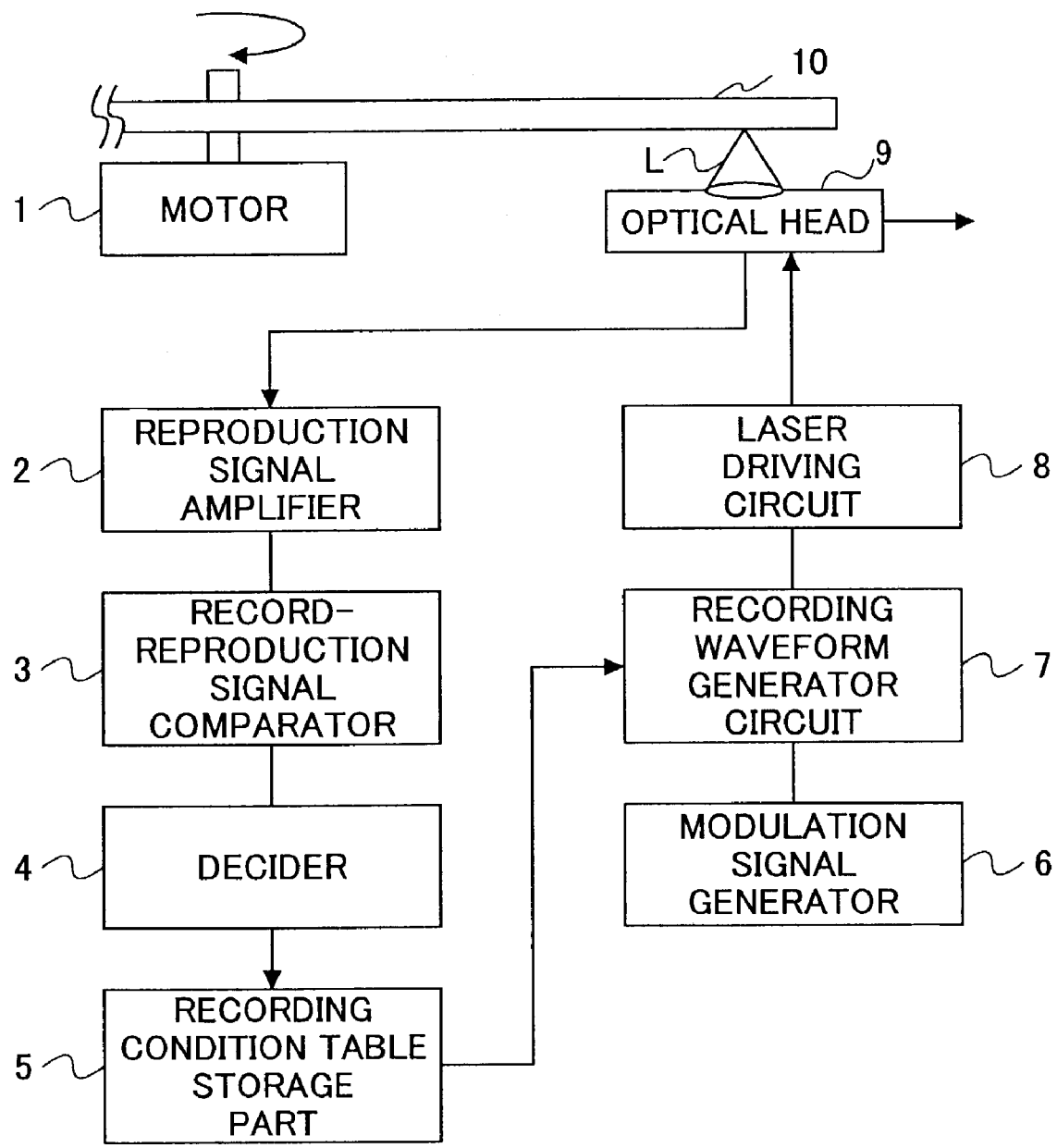
FIG. 8 is a block diagram illustrating the structure of an optical disk recording-reproducing apparatus according to a first embodiment of the present invention.

FIG. 8 is a block diagram illustrating the structure of an optical disk recording-reproducing apparatus according to the first embodiment of the present invention.

An optical disk recording-reproducing apparatus 100 comprises a motor 1, a reproduction signal amplifier 2, a record-reproduction signal comparator 3, a decider 4, a recording condition table storage part 5, a modulation signal generator 6, a recording waveform generator circuit 7, a laser driving circuit 8, and an optical head 9.

When multi-level data are recorded, that is, a recorded mark is formed, the motor 1 rotates an optical disk 10 at a predetermined rotational speed. The modulation signal generator 6 supplies all combinations, that is, all multi-level data sequences of a plurality of multi-level data as test patterns to the recording waveform generator circuit 7. The recording-waveform generator circuit 7 reads a recording condition table from the recording condition table storage part 5 and then supplies recording pulses in accordance with the test patterns to the laser driving circuit 8. The laser driving circuit 8 causes a semiconductor laser illuminant, which is not illustrated in FIG. 8, of the optical head 9 to emit a laser beam L. The optical head 9 condenses the laser beam-L on the optical disk 10 so as to form recorded marks.

On the other hand, when the recorded test pattern is reproduced, a photo acceptance part of the optical head 9, which is not illustrated, accepts reflection light from the optical disk 10 and then the reflection light is converted into an electronic signal. The electronic signal is supplied to the record-reproduction signal comparator 3 via the reproduction signal amplifier 2. The record-reproduction signal comparator 3 compares the reproduction signal level with the corresponding target signal level and then the decider 4 decides a difference between the levels. If the difference is more than a predetermined value, a recording condition of the test pattern is corrected and subsequently the recording condition table is updated. The above-mentioned reproduction process is repeated until the difference is less than the predetermined value. As a result, it is possible to obtain an optimal recording condition by repeating the reproduction process.

As mentioned above, the laser driving circuit 8 and the optical head 9 change radiation energy of a laser beam corresponding to a multi-level data sequence formed of a plurality of multi-level data in a multi-level fashion and radiate the laser beam at the determined radiation energy level on an information recording medium. Namely, the laser driving circuit 8 and the optical head 9 work as a recording part for recording recorded marks in individual cells on the information recording medium for a given multi-level data sequence and a laser beam generating part for radiating the laser beam at the radiation energy level corresponding to the multi-level data sequence.

On the other hand, after the multi-level data sequence is recorded in the information recording medium, the reproduction signal amplifier 2, the record-reproduction signal comparator 3 and the optical disk 9 work as a reproduction signal detecting part for detecting reproduction signals of recorded marks in cells to be reproduced.

Furthermore, the record-reproduction signal comparator 3 works as a reproduction signal generating part for determining the level of a reproduction signal of a recorded mark in a cell to be reproduced based on recorded marks in cells located immediately before and after the cell to be reproduced.

Furthermore, the decider 4, the recording condition table storage part 5, the recording waveform generator circuit 7 and the laser driving circuit 8 work as a laser beam correcting part for correcting the radiation energy level of the laser beam so as to separate a distribution of the reproduction signal level of the recorded mark to be reproduced from other level distributions.

Under the above-mentioned configuration, the optical disk recording-reproducing apparatus 100 iteratively updates recording conditions until the differences between reproduction signal levels and the corresponding target signal levels of given test patterns become less than a predetermined value in order to reduce the multi-level determination errors. In this fashion, the optical disk recording-reproducing apparatus 100 can implement an information recording method for properly recording multi-level information by optimizing the recording conditions, that is, the radiation energy of the laser beam.

A description will now be given of a multi-level data determination method according to the information recording method by using an example of 8-level recoding.

Figure 9:
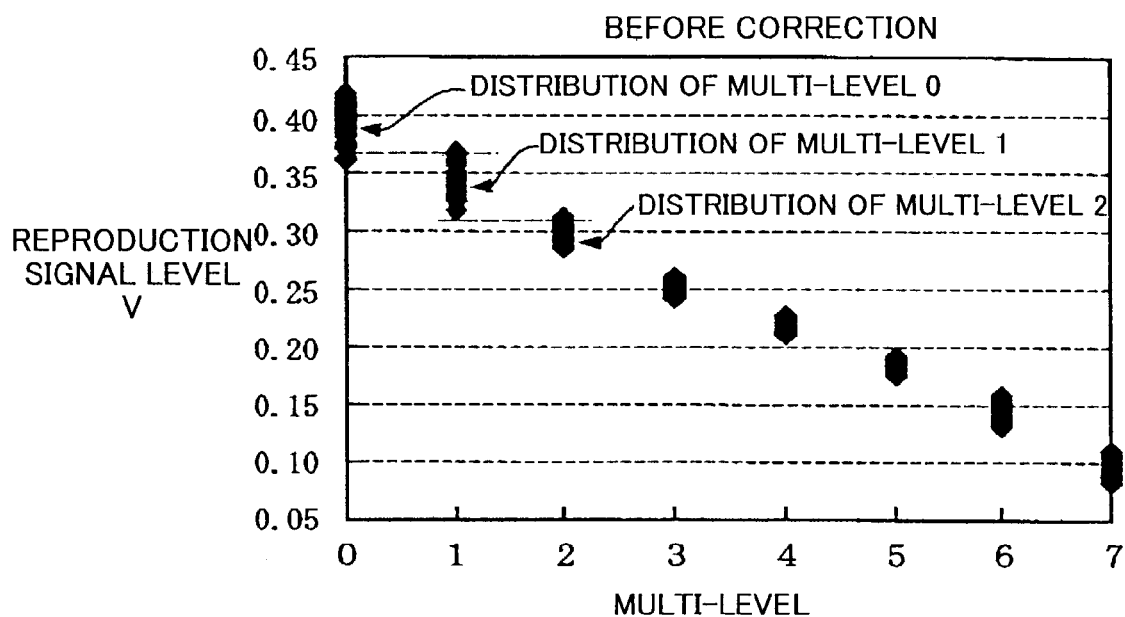
FIG. 9 is a distribution graph of reproduction signal levels for explaining the multi-level data determination method.
Figure 10:
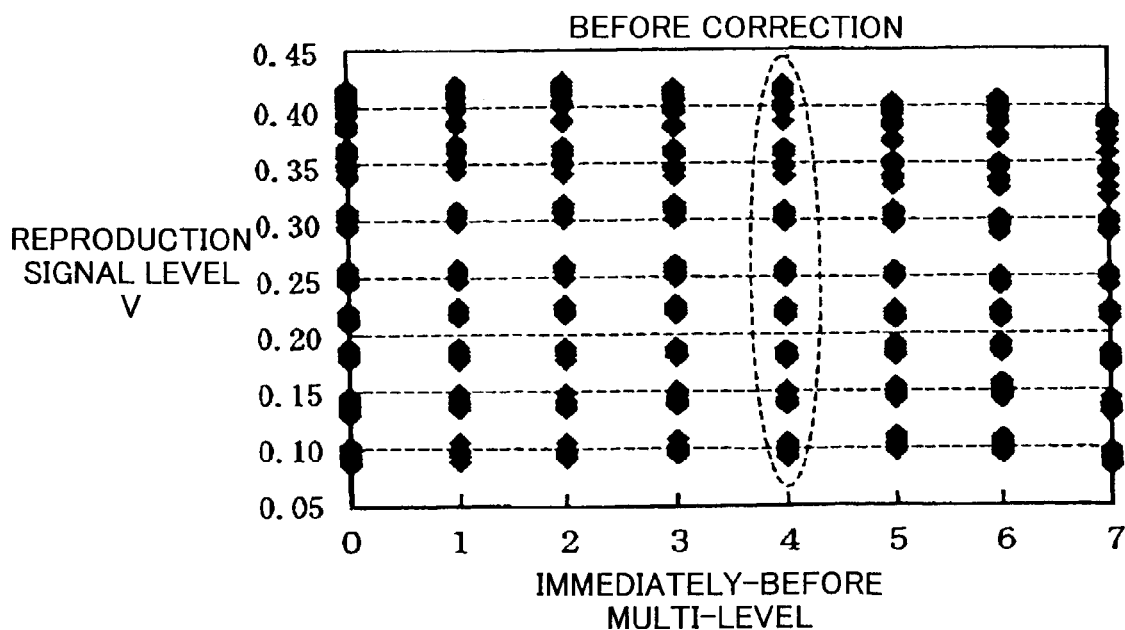
FIG. 10 is a distribution graph obtained by plotting the horizontal axis in FIG. 9 to multi-level data recorded in a cell immediately before a cell to be determined.

FIG. 9 and FIG. 10 are distribution graphs of reproduction signal levels for explaining the multi-level data determination method.

FIG. 9 handles a reproduction signal in a case where recorded random multi-level data sequences are reproduced. As is shown in FIG. 9, the multi-level data "1" has overlapped distribution areas with the adjacent multi-level data "0" and "2". When the observed level of a signal is in the overlapped areas, there arises a determination error according to the multi-level data determination method.

FIG. 10 is a distribution graph obtained by plotting the horizontal axis in FIG. 9 to multi-level data recorded in a cell immediately before a cell to be determined. As is shown in FIG. 10, the multi-level 4 has clearly separated 8 distributions for individual signal levels. Although some of the multi-levels other than the multi-level 4 have narrow intervals between the multi-level 0 and the multi-level 1, there is no overlapped area between the multi-level 0 and the multi-level 1. As a result, even in the case where the multi-level 1 has the overlapped areas with the multi-level "0" and the multi-level "2", if multi-level data immediately before a cell to be determined are obtained, it is observed that the multi-level data determination error can be reduced.

The optical disk record-reproduction apparatus 100 implements the multi-level data determination method as a recording power correction method of the multi-level information recording method according to the present invention. In this multi-level data determination method, the optical disk recording-reproducing apparatus 100 acquires relations between pairs of multi-level data in both a cell to be determined and the immediately-before cell and reproduction signal levels in advance in order to establish determination criteria of the multi-level data. Then, the optical disk recording-reproducing apparatus 100 determines the multi-level data by classifying the reproduction levels for each multi-level data recorded in the immediately-before cell.

The multi-level information recording method according to the present invention intends to properly separate individual signal level distributions of immediately-before multi-level data. Here, instead of the immediately before multi-level data, the immediately-after multi-level data or both of the immediately-before multi-level data and the immediately-after multi-level data may be used. In order to achieve this purpose, the optical disk recording-reproducing apparatus 100 arranges individual distributions of reproduction signal levels in equal intervals. In addition, the optical disk recording-reproducing apparatus 100 corrects a recording condition for each combination of multi-level data of the cell to be reproduced and the immediately-before cell until deviations of the individual distributions is minimized.

The recording condition correction method includes two processes.

The first process sets a target signal level serving as a target for optimizing a recording condition. The second process optimizes the recording condition so as to converge a reproduction signal level of recorded test data into the target signal level.

Figure 11:
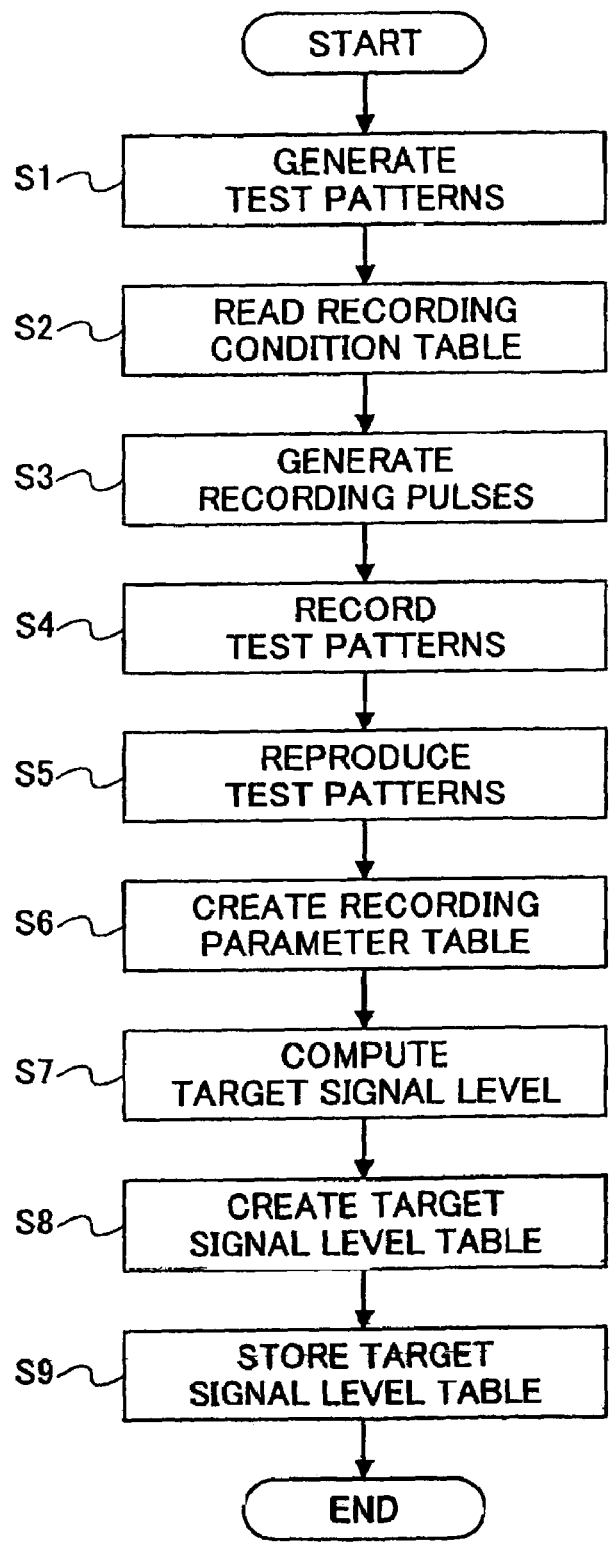
FIG. 11 is a flowchart of the first process for setting target signal levels.
Figure 12:
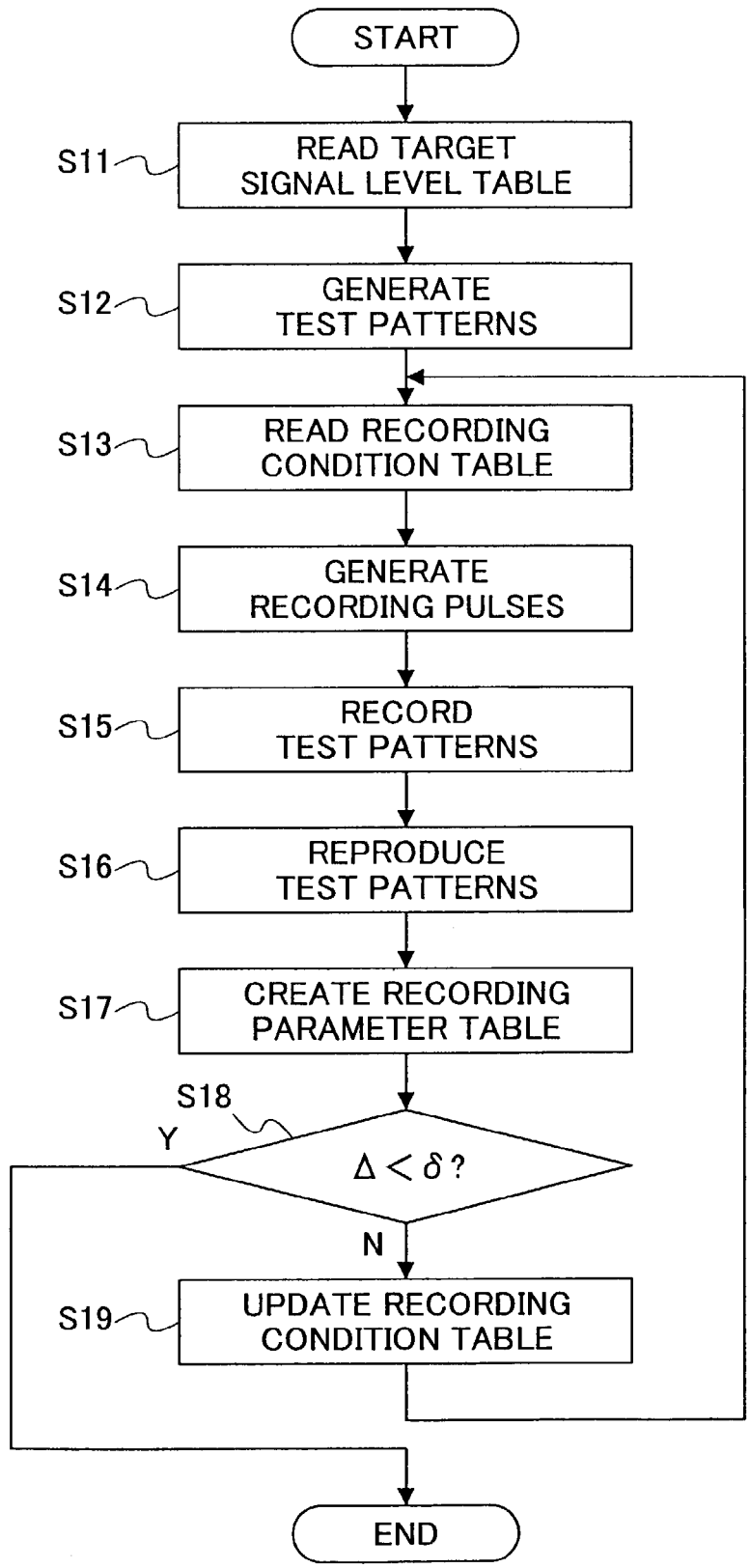
FIG. 12 is a flowchart of the second process for updating recording conditions.

A detailed description will now be given, with reference to FIG. 11 and FIG. 12, of the first and the second processes. FIG. 11 and FIG. 12 are flowcharts of the first process and the second process, respectively.

As is shown in the flowchart in FIG. 11, the optical disk recording-reproducing apparatus 100 according to this embodiment generates test patterns at step S1. At step S2, the optical disk recording-reproducing apparatus 100 reads a current recording condition table. At step S3, the optical disk recording-reproducing apparatus 100 generates a recording pulse corresponding to a combination of multi-level data. At step S4, the optical disk recording-reproducing apparatus 100 records the test pattern in an information recording medium. At step S5, the optical disk recording-reproducing apparatus 100 reproduces the test pattern at step S5. At step S6, the optical disk recording-reproducing apparatus 100 detects a reproduction signal level corresponding to the combination and then creates the following recording parameter table (TABLE 1) based on the detection result.

TABLE 1

| before(i) | cell to be determined(j) | after(k) | Vijk | WPijk |
|---|---|---|---|---|
| 0 | 0 | 0 | V000 | WP000 |
| 0 | 0 | 1 | V001 | WP001 |
| 0 | 0 | 2 | V002 | WP002 |
| ... | ... | ... | ... | ... |
| ... | ... | ... | ... | ... |
| 7 | 7 | 7 | V777 | WP777 |

The parameter Vijk represents a voltage level applied for the reproduction of the jth cell to be determined, and the parameter WPijk represents the recording parameter thereof.

At step S7, the optical disk recording-reproducing apparatus 100 computes two averages Vi0 and Vi7 shown in the following equations with reference to the recording parameter table in order to set a target signal level V'ij;

$$V_{i0} = \sum_{k=0}^{7} V_{i0k}/8 \qquad (2)$$

$$V_{i7} = \sum_{k=0}^{7} V_{i7k}/8. \qquad (3)$$

Based on computation results, the target signal level V'ij is obtained as follows;

$$V'ij = Vi0 - j(Vi0 - Vi7)/7 \qquad (4).$$

At step S8, the optical disk recording-reproducing apparatus 100 obtains a target signal level table (TABLE 2).

TABLE 2

| before(i)/cell(j) | 0 | 1 | 2 | ... | 7 |
|---|---|---|---|---|---|
| 0 | V00 | V'01 | V'02 | ... | V07 |
| 0 | V10 | | | | |
| 0 | | | | | |
| ... | | | | | ... |
| ... | | | | | ... |
| 7 | V70 | | | ... | V77 |

At step S9, the optical disk recording-reproducing apparatus 100 stores the target signal level table in a memory thereof, and then the first process is terminated.

In this fashion, it is possible to set each target signal level of the target signal level table at an equal interval between adjacent multi-levels.

Here, the target signal levels are not necessarily set at an equal interval. The multi-level data "0", "1" and "2" having small recorded marks tend to receive greater influences by inter-symbol interference, and the distributions thereof have larger deviations than the other multi-level data as shown in FIG. 9. In this case, if the optical disk recording-reproducing apparatus 100 sets narrower intervals between higher multi-level data and wider intervals between the multi-level data "0", "1" and "2" by way of compensation, it is possible to determine multi-level data with higher accuracy.

Next, a detailed description will now be given, with reference to the flowchart in FIG. 12, of the second process for updating a recording condition. The optical disk recording-reproducing apparatus 100 sets a recording pulse waveform and recording power as an initial recording condition. In this case, for instance, the optical disk recording-reproducing apparatus 100 uses the recording pulse waveform and the recording power in a state where the average of reproduction signal levels becomes approximately linear toward multi-level data. Also, if initial recording conditions are recorded in an information recording medium in advance, the second process may be omitted. When the initial recording conditions are recorded in an area other than a user data area in the information recording medium, it is possible to avoid capacity decrease of the user data area. Also, if the initial recording conditions are formed as pits, it is unnecessary to record the initial recording conditions for each information recording medium. As a result, it is possible to easily produce a large number of the information recording media having the initial recording conditions.

As is shown in the flowchart of the second process in FIG. 12, the optical disk recording-reproducing apparatus 100 reads a target signal level from the target signal level table created at the first process at step S11. Steps S12 through S17 are similar to steps S1 through S6 in the first process and the description thereof will be omitted. At step S18, the optical disk recording-reproducing apparatus 100 computes differences $\Delta$ between reproduction signal levels and target signal levels for all combinations and determines whether or not there is a combination such that the inequality $\Delta<\delta$ is satisfied. If there is such a combination, the combination is not corrected. On the other hand, if there is a combination such that the inequality $\Delta<\delta$ is not satisfied, the optical disk recording-reproducing apparatus 100 changes the recording condition for the combination by decreasing the difference $\Delta$. Then, the optical disk recording-reproducing apparatus 100 updates the current recording condition table at step S19 and returns to step S13. In this fashion, the optical disk recording-reproducing apparatus 100 repeats steps S13 through S19 until the inequality $\Delta<\delta$ is satisfied for all combinations.

A description will now be given of a recording condition correction process by the optical disk recording-reproducing apparatus 100 according to this embodiment.

Figure 1:
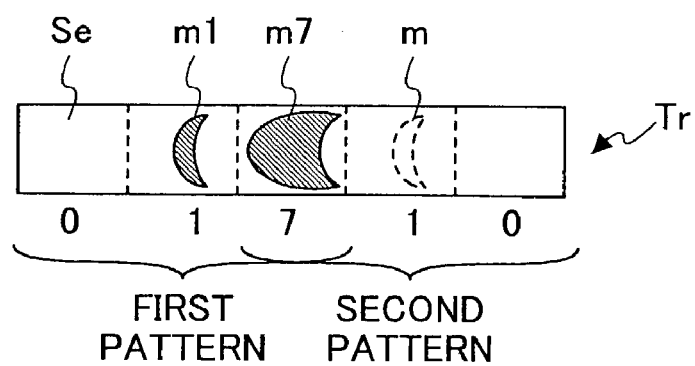
FIG. 1 shows an observation result of recorded marks according to a conventional information recording method in a case.
Figure 2A:
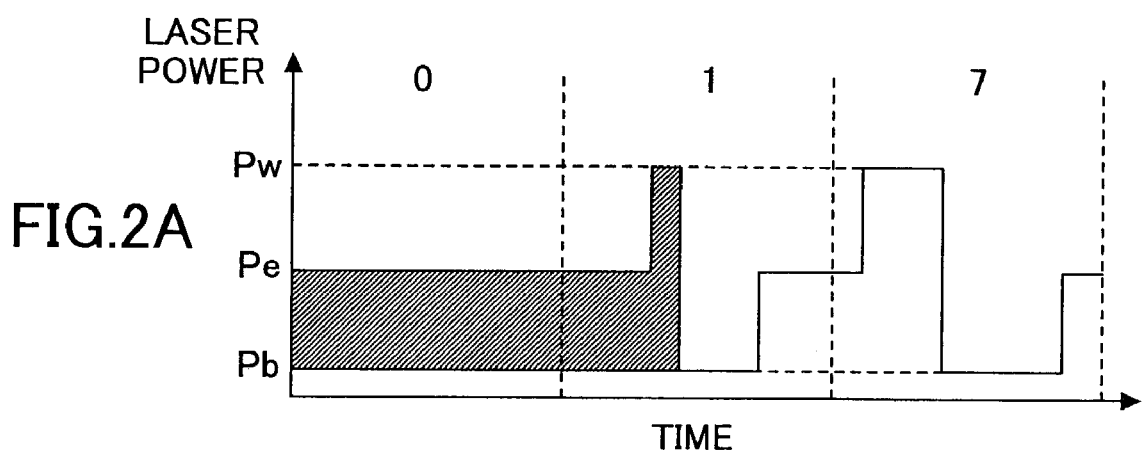
FIGS. 2A and 2B show waveform diagrams of variations of recording power under the conventional multi-level information recording method with respect to a first pattern and a second pattern, respectively.
Figure 2B:
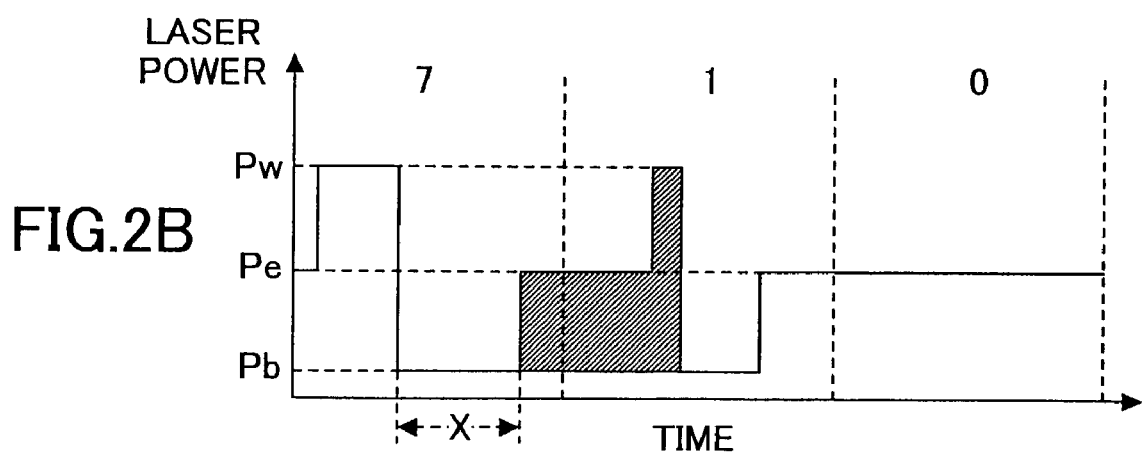
Figure 3:
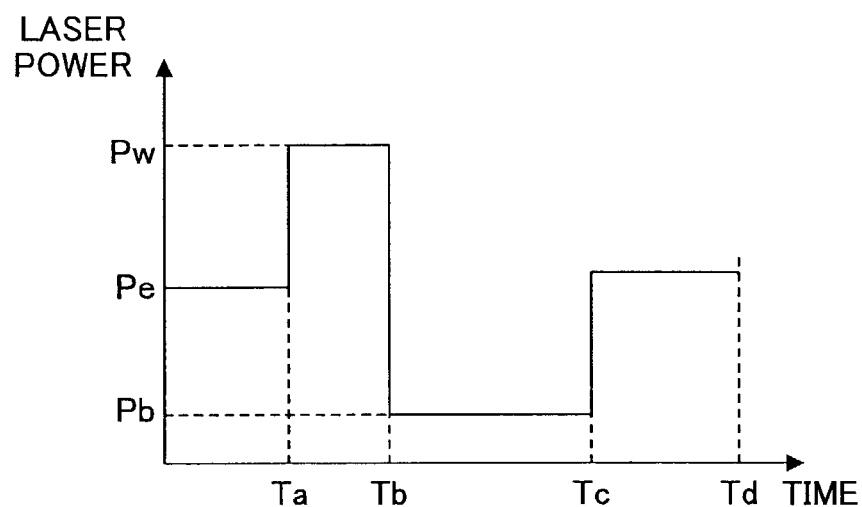
FIG. 3 is a diagram illustrating three types of recording power Pw, Pe and Pb.
Figure 4A:
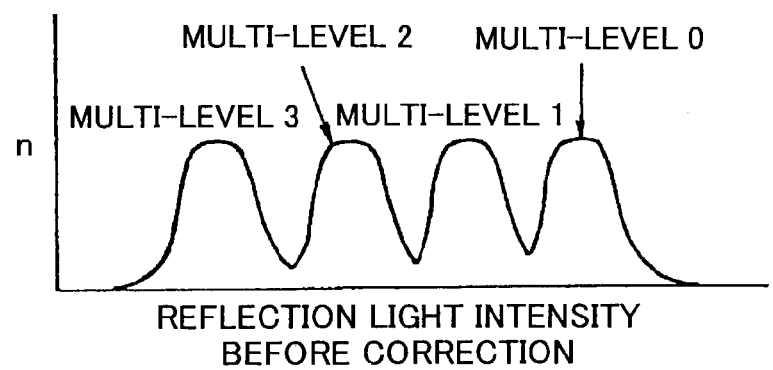
FIGS. 4A and 4B show four multi-level distributions before and after the recording power correction according to the above-mentioned conventional multi-level information recording method, respectively.
Figure 4B:
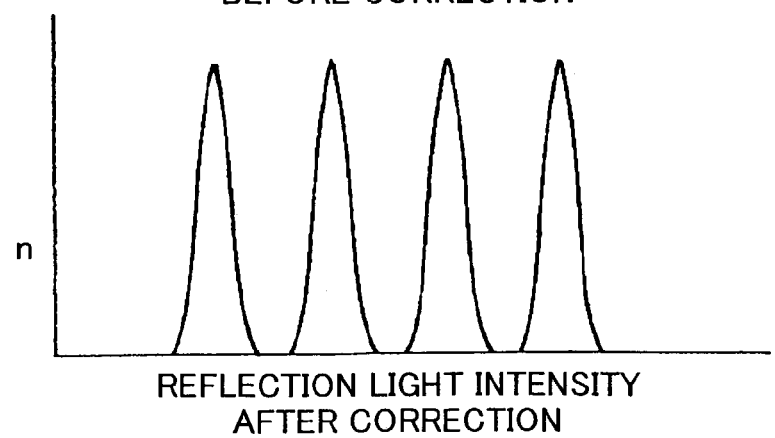
Figure 5A:
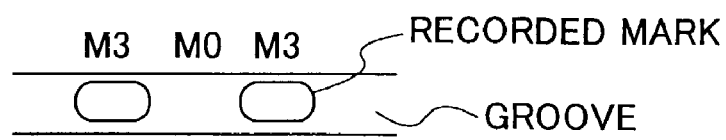
FIG. 5A is a plan view of a groove where recorded marks are formed for a 4-level data sequence "3, 0, 3"
Figure 5B:
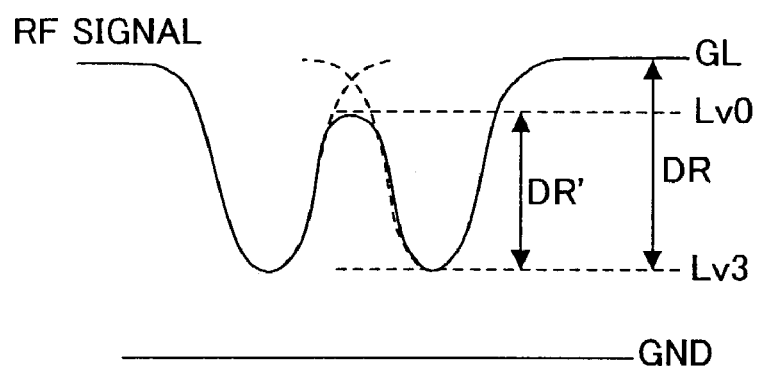
FIG. 5B is a diagram illustrating an RF (Radio Frequency) signal for forming the recorded marks.
Figure 6:
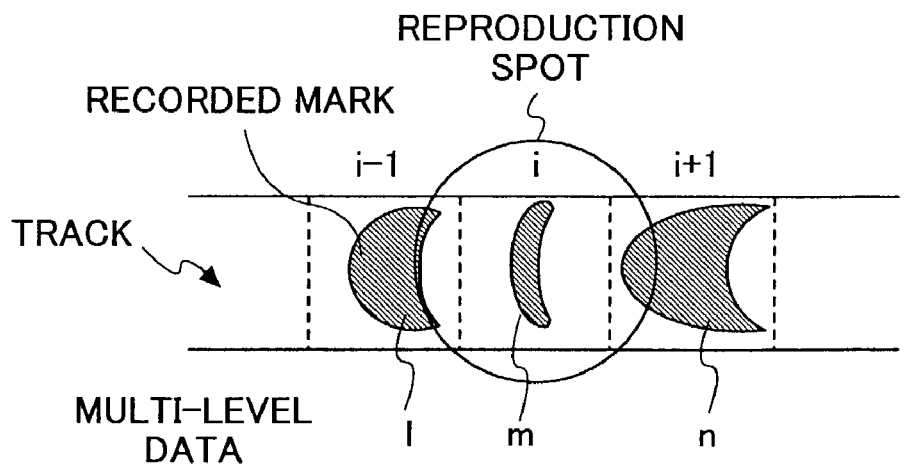
FIG. 6 shows an example of recorded marks formed in a predetermined interval between adjacent recorded marks in a case where multi-level data "1", "m" and "n" are recorded in the (i−1)st cell through (i+1)st cell in a track Tr, respectively.
Figure 7:
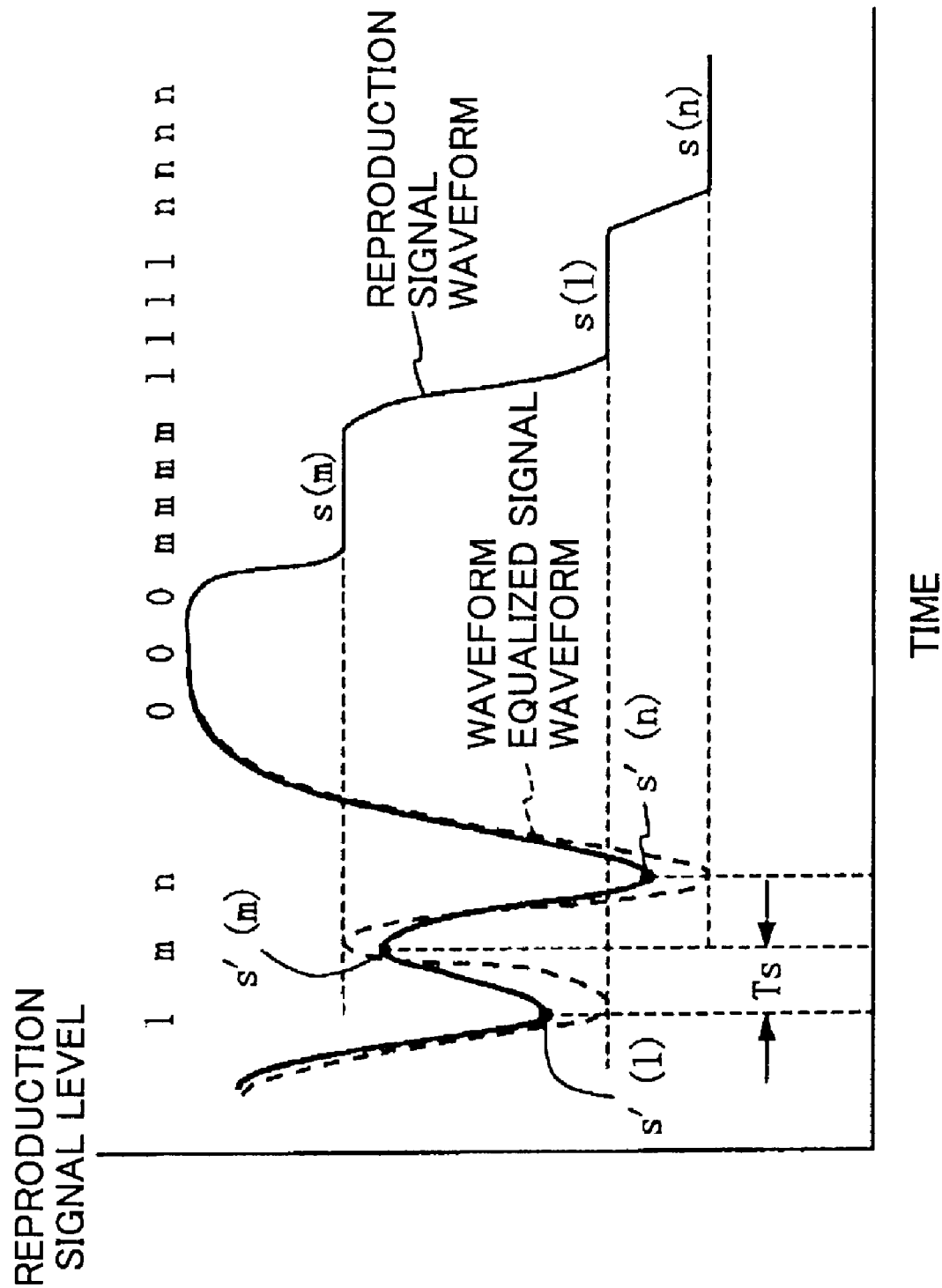
FIG. 7 shows waveforms before and after a waveform equalizing process for a reproduction signal of the recorded marks in FIG. 6.

A recording pulse generated by the optical disk recording-reproducing apparatus 100 comprises a top (recording) pulse, a cooling pulse and an erasing pulse. As is shown in FIG. 3, the size of a recorded mark is prescribed by the top pulse width (Tb–Ta) and the cooling pulse width (Tc–Tb). Otherwise, the size can be controlled by varying the recording power Pw and the erasing power Pe.

Here, the optical disk recording-reproducing apparatus 100 mainly controls the signal level by varying the cooling pulse width from the viewpoint of controllability. However, when a recorded mark is formed immediately after a long recorded mark higher than the multi-level 5 in the 8-level data recording, there is a shortage of energy for heating recording layer. Therefore, if a long recorded mark is formed immediately before a cell, it is necessary to increase not only the cooling pulse width but also the top pulse width, that is, to increase the recording power Pw.

A description will now be given of a correction amount with respect to the recording condition in the optical disk recording-reproducing apparatus 100.

Figure 13:
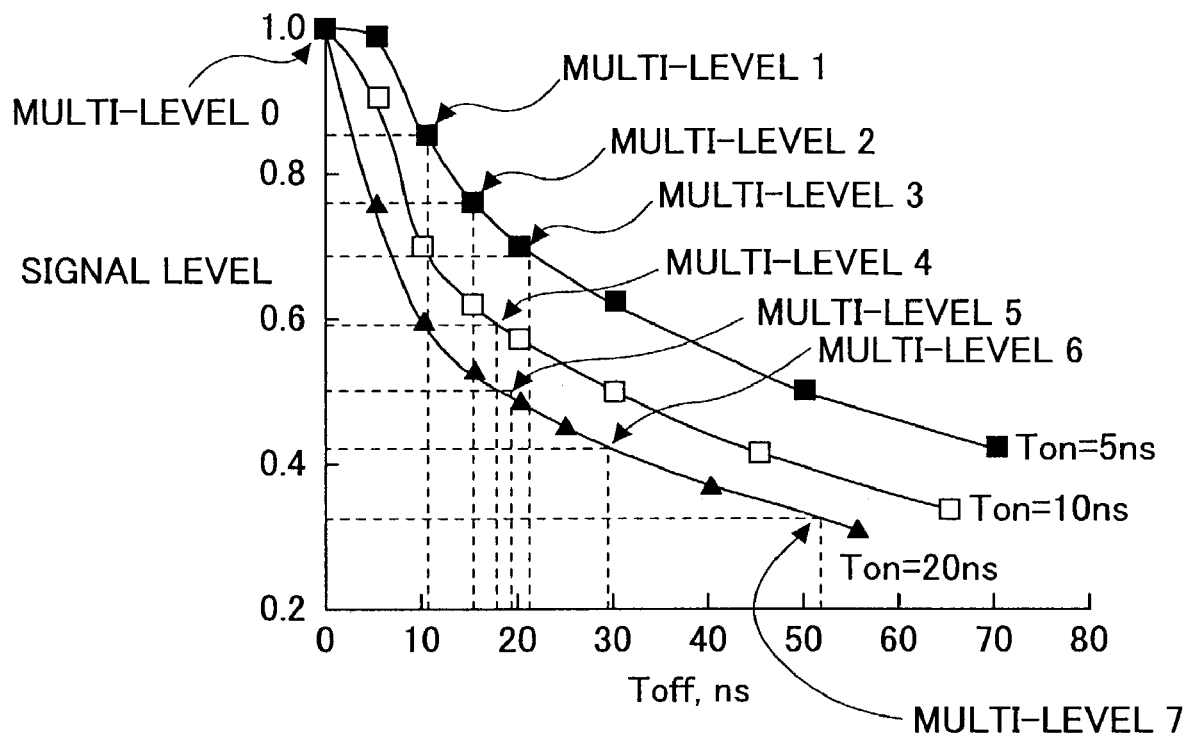
FIG. 13 is a graph for explaining Toff (cooling pulse width) dependency of a signal level.

FIG. 13 is a graph for explaining Toff (cooling pulse width) dependency of a signal level in a case where the recording line velocity=6.0 m/s, Pw=15.0 mW, Pe=8.0 mW, and Pb=0.1 mW. Here, Toff represents Tc–Tb in FIG. 3. In addition, the vertical axis of the graph is normalized so that the multi-level 0 can have the signal level 1.0.

Based on the graph in FIG. 13, it is possible to set Ton, which represents Tb–Ta in FIG. 3, and Toff so that the multi-level 0 through the multi-level 7 can have approximate equal intervals. Furthermore, if the optical disk recording-reproducing apparatus 100 computes and stores relationship between signal level changes of individual multi-levels and Toff, it is possible to efficiently find a correction amount of parameters so as to decrease differences between the target values and the signal levels. In this fashion, it is possible to optimize the recording condition at less iteration times.

A description will now be given of simplification of the recording correction process and update of the optimal recording condition in the optical disk recording-reproducing apparatus 100.

The optimal recording condition or a recommended recording condition is recorded in an optical disk or a memory of the optical disk recording-reproducing apparatus 100 in advance, and information is recorded and reproduced based on the stored recording condition. If the optical disk recording-reproducing apparatus 100 finds a multi-level data sequence of a high determination error based on reproduction results, the optical disk recording-reproducing apparatus 100 corrects only the multi-level data sequence. Thus, it is possible to immediately optimize recording conditions. Then, the optical disk recording-reproducing apparatus 100 maintains the updated optimal recording condition in the optical disk or the memory again. In this fashion, it is possible to optimize the recording condition in accordance with varying conditions of the optical disk recording-reproducing apparatus 100 caused by time passage and environmental fluctuation.

A description will now be given of an optical disk (information recording medium) according to the present invention.

Figure 14:
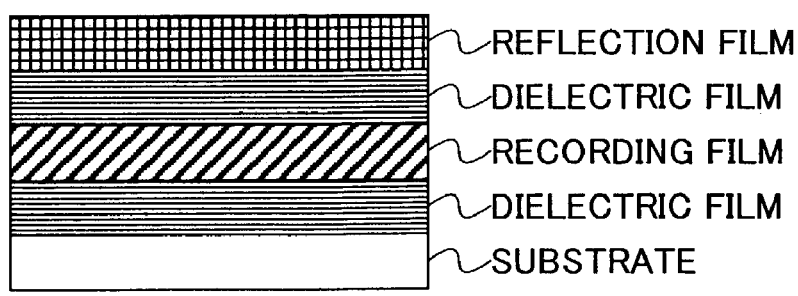
FIG. 14 is a diagram illustrating the structure of layers on a substrate of the optical disk according to an embodiment of the present invention.

FIG. 14 shows the structure of layers on a substrate of an optical disk 150 according to the present invention.

The optical disk 150 is a phase-change optical disk in which information can be recorded by using laser light of the wavelength 650 nm. The substrate is formed of a polycarbonate of the diameter 120 mm and the thickness 0.6 mm. Grooves are formed on the substrate surface by injection molding. The groove has approximate 0.35 μm in width, approximate 40 nm in depth. The track pitch is 0.745 μm, and the tracks are densely provided in a spiral form between the outer circumference and the inner circumference. A dielectric film, phase-change recording film, a dielectric film and a reflection film are layered on the substrate.

The optical disk recording-reproducing apparatus 100 having the wavelength 650 nm and an objective lens of NA=0.65 records 8-level information in the phase-change optical disk at the recording linear velocity 6.0 m/s, the cell length 0.48 μm (T0=80 ns), the laser power Pe=8 mW, Pw=15 mW and Pb=0.1 mW. As test patterns, 512(=$8^3$) patterns are prepared.

Figure 15A:
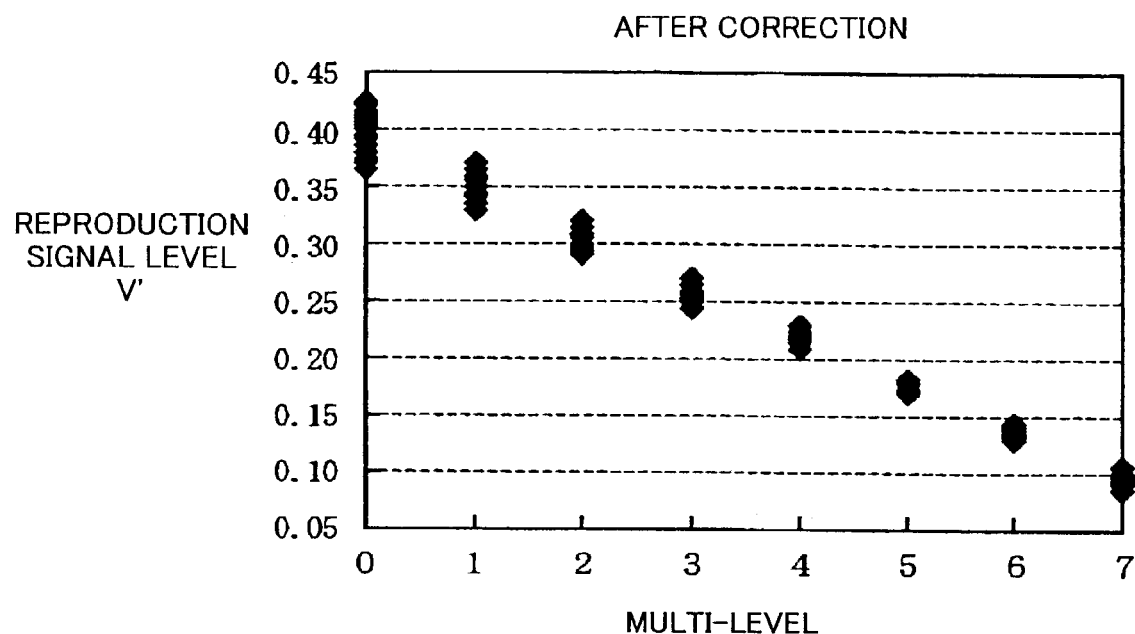
FIGS. 15A and 15B are distribution graphs of multi-level signals corrected under a multi-level information recording method according to the present invention.
Figure 15B:
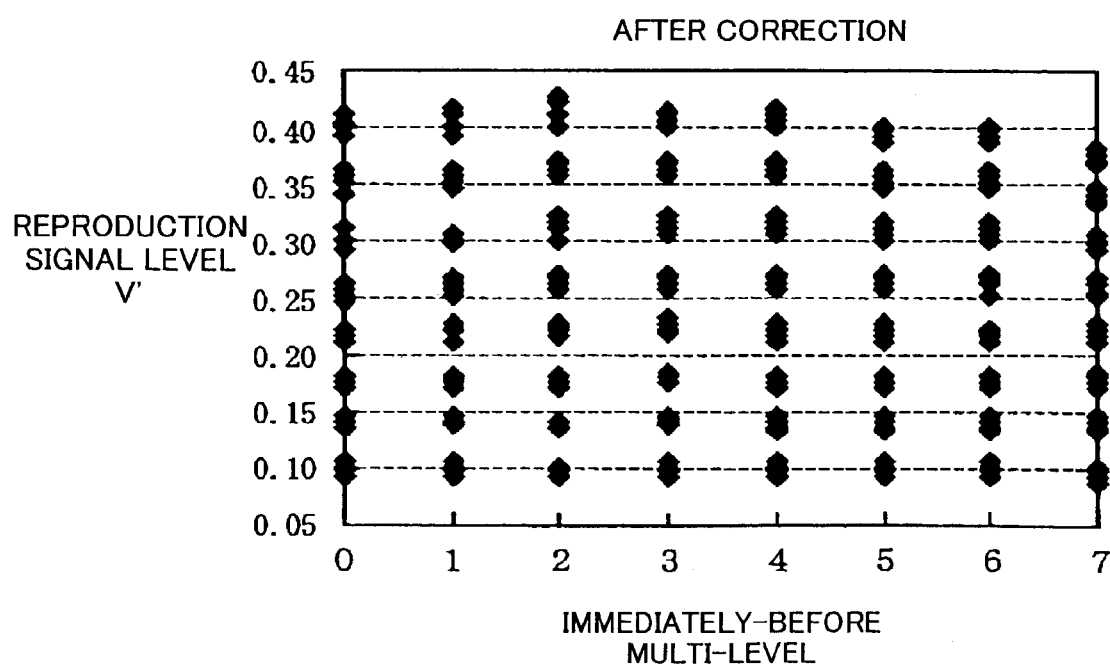

When an initial recording condition is used to record the multi-level information, reproduction signals have the distributions as shown in FIG. 9. On the other hand, when the recording condition is optimized, reproduction signals have distributions as shown in FIG. 15A. In FIG. 9, there are some overlapping areas between adjacent multi-level. In the level distributions of individual immediately-before multi-level data in FIG. 15B, however, the overlapping areas are eliminated through the recording correction. Here, if the correction table is not optimized, the multi-level data determination error is 2.08% shown in TABLE 3. In contrast, if the correction table is optimized, the multi-level data determination error is improved up to 0.07% shown in TABLE 4.

TABLE 3

| ML | Ave(V) | σ(V) | Error |
|---|---|---|---|
| 0 | 0.410 | 0.014 | 8.09% |
| 1 | 0.362 | 0.010 | 2.60% |
| 2 | 0.314 | 0.007 | 2.60% |
| 3 | 0.268 | 0.008 | 1.05% |
| 4 | 0.222 | 0.011 | 1.04% |
| 5 | 0.175 | 0.009 | 0.52% |
| 6 | 0.132 | 0.008 | 0.00% |
| 7 | 0.088 | 0.008 | 0.74% |
|  |  | AVE | 2.08% |

TABLE 4

| ML | Ave(V) | σ(V) | Error |
|---|---|---|---|
| 0 | 0.411 | 0.007 | 0.00% |
| 1 | 0.363 | 0.007 | 0.00% |
| 2 | 0.315 | 0.007 | 0.52% |
| 3 | 0.269 | 0.007 | 0.00% |
| 4 | 0.223 | 0.007 | 0.00% |
| 5 | 0.177 | 0.007 | 0.00% |
| 6 | 0.133 | 0.007 | 0.00% |
| 7 | 0.087 | 0.006 | 0.00% |
|  |  | AVE | 0.07% |

A description will now be given of another optical disk (information recording medium) according to the present invention.

Figure 16A:
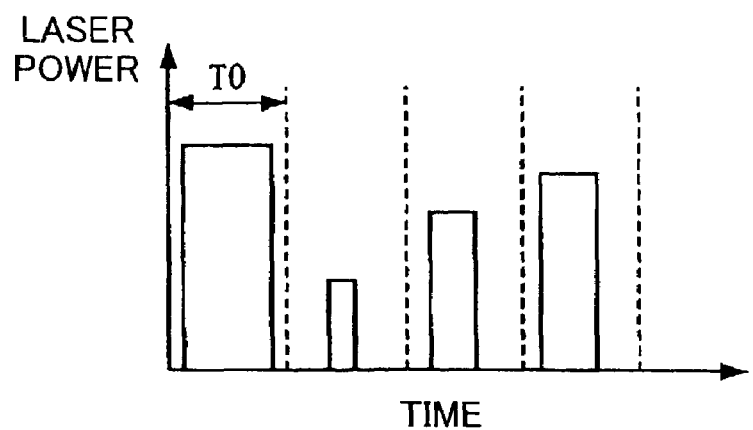
FIG. 16A is a diagram partially illustrating a laser pulse waveform when a latent image of a pit sequence is formed on a photoresist coated glass disk.
Figure 16B:
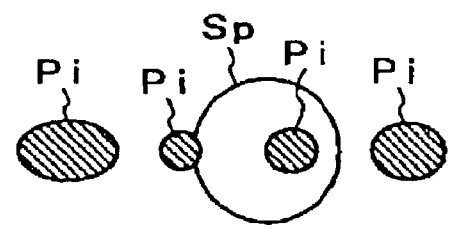
FIG. 16B is an enlarged plan view of the photoresist coated glass disk in FIG. 16A.
Figure 16C:
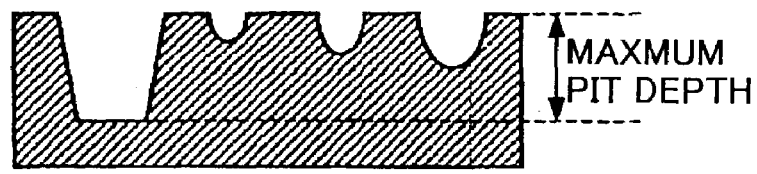
FIG. 16C is an enlarged sectional view of the photoresist coated glass disk in FIG. 16A.
Figure 16D:
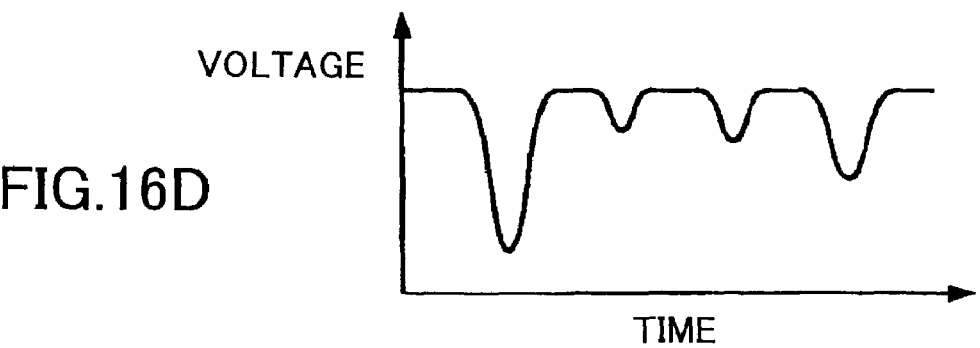
FIG. 16D is a graph of a reproduction signal when the recorded photoresist coated glass disk in FIG. 16A is reproduced.

An optical disk is a ROM type optical disk. While the phase-change optical disk stores multi-level information by varying the area ratio between the crystal area and the amorphous area in an optical spot to be reproduced in the multi-level fashion, the ROM optical disk stores multi-level information by controlling the pit area, the pit depth and the pit position. FIG. 16A shows a portion of a laser pulse waveform when a latent image of a pit sequence is formed on a photoresist coated glass disk. The pit area and the pit depth are controlled by laser power and laser radiation time, and the pit position is controlled by laser radiation timings. The maximal pit depth is set as λ/4 where λ represents the wavelength of a reproduction light so that the amplitude of the reproduction signal can be maximized. The pit depth is controlled by adjusting the film thickness of the photoresist on the glass disk. A laser pulse as shown in FIG. 16A is radiated on the glass disk surface and the glass disk is developed. FIGS. 16B and 16C show a pit configuration on the developed glass disk. FIG. 16B is an enlarged plan view of the glass disk, and FIG. 16C is an enlarged sectional view of the glass disk. When the glass disk is reproduced, the multi-level recording signal as shown in FIG. 16D is obtained.

A substrate of the ROM optical disk is formed of a polycarbonate of the diameter 120 mm and the thickness 0.6 mm. Pits are formed on the substrate surface by injection molding. The pit has approximate 0.35 μm as the maximal width and approximate 100 nm as the maximal depth. The track pitch is 0.74 μm, and the tracks are densely formed in a spiral form between the outer circumference and the inner circumference. The ROM optical disk is formed by coating a reflection film on the substrate. The ROM optical disk has the cell length of 0.48 μm (T0=80 ns) and stores 8-level information.

The optical disk recording-reproducing apparatus 100 according to the present invention reproduces a ROM optical disk similarly to the above-mentioned phase-change optical disk. When the pit configuration is not corrected, the reproduction signal levels have the distributions as shown in FIG. 9. In contrast, when the pit configuration is corrected, reproduction signals have distributions as shown in FIG. 15A. In FIG. 9, there are some overlapping areas between adjacent multi-level data. In the level distributions of individual immediately-before multi-level data in FIG. 15B, however, the overlapping areas are eliminated through the pit configuration correction. Here, if the recording condition table is not optimized, the multi-level determination error is 2.08% shown in TABLE 3. In contrast, if the recording condition table is optimized, the multi-level determination error is improved up to 0.07% shown in TABLE 4.

The optical disk recording-reproducing apparatus 100 according to the present invention corrects radiation energy of a laser beam in accordance with a multi-level data sequence so as to separate level distributions of a reproduction signal in a cell to be reproduced and the immediately-before cell. It is noted that the immediately-after cell or both the immediately-before and after cells may be used instead of the immediately-before cell. According to the optical disk recording-reproducing apparatus 100, it is possible to reduce the multi-level determination error.

Furthermore, since the optical disk recording-reproducing apparatus 100 corrects the laser beam radiation energy by one unit of three multi-level data, it is possible to set a correction amount separately with respect to all combinations of three multi-level data.

Additionally, when the inequality n>(m−1)/2 is satisfied for the multi-level data "n" in the immediately-before cell, the optical disk recording-reproducing apparatus 100 corrects the laser beam radiation energy by increasing the energy level. As a result, it is possible to sufficiently heat the recording film of an information recording medium and form a stable recorded mark.

Additionally, since the optical disk recording-reproducing apparatus 100 corrects the laser beam radiation energy so as to set an equal interval between a cell to be reproduced and the immediately-before cell, it is possible to reduce the multi-level determination error. Here, an interval between a cell to be reproduced and the immediately-after cell or both an interval between a cell to be reproduced and the immediately-before cell and an interval between the cell to be reproduced and the immediately-after cell may be set as approximately equal width.

Additionally, since the optical disk recording-reproducing apparatus 100 corrects the laser beam radiation energy so that the interval between a cell to be reproduced and the immediately-before cell can correspond to differences of reproduction signal levels, it is possible to reduce the multi-level data determination error. Here, an interval between a cell to be reproduced and the immediately-after cell or both an interval between a cell to be reproduced and the immediately-before cell and an interval between the cell to be reproduced and the immediately-after cell may be set corresponding to differences of reproduction signal levels.

Additionally, since the optimal laser beam radiation energy information corresponding to multi-level data sequences are stored in an information recording medium 150 or an information recording-reproducing apparatus 100, it is unnecessary to optimize the radiation energy for each recording operation. As a result, it is possible to efficiently record information.

Additionally, if the optimal laser beam radiation energy information corresponding to multi-level data sequences is stored in the information recording medium 150 or the optical disk recording-reproducing apparatus 100 and the optical disk recording-reproducing apparatus 100 records multi-level information under the radiation energy information, it is unnecessary to optimize the radiation energy for each recording operation. As a result, it is possible to efficiently record information.

Additionally, if laser beam radiation energy and correction amount are recorded in an area other than a user data area, it is possible to efficiently optimize the radiation energy without the loss of the capacity of the user data area.

Additionally, if a phase-change recording material is used as an information recording medium 150 of the optical disk recording-reproducing apparatus 100, it is possible to control shapes of recorded marks with high accuracy.

Additionally, if the optical disk recording-reproducing apparatus 100 corrects shapes of recorded marks so that the reproduction signal level of a cell to be reproduced can be separated by referring to the immediately-before cell and the immediately-after cell, it is possible to reduce the multi-level determination error.

Additionally, if the optical disk recording-reproducing apparatus 100 corrects shapes of recorded marks in accordance with the pit area, the pit depth and the pit position, it is possible to control the reproduction signal level with high accuracy.

A description will now be given of another optical disk recording-reproducing apparatus according to the present invention.

Figure 17:
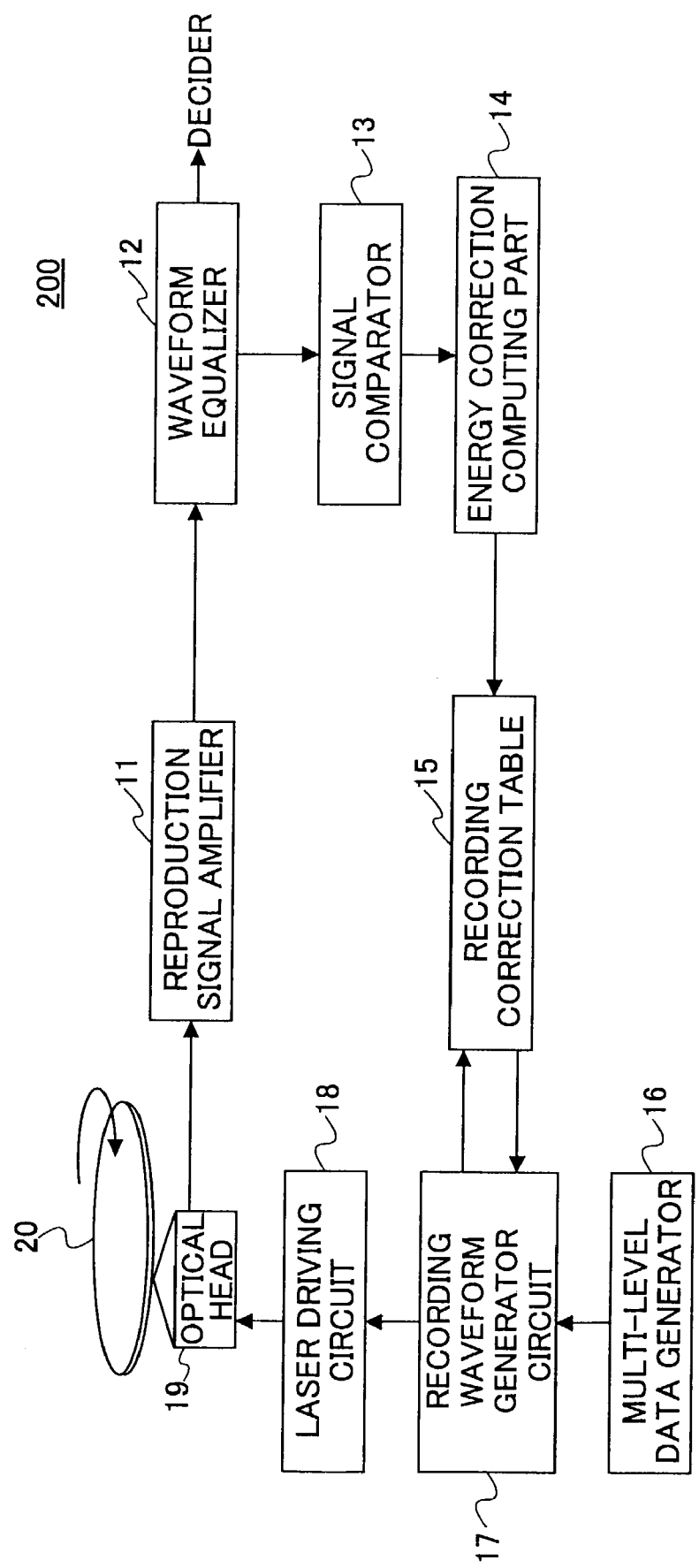
FIG. 17 is a block diagram of another optical disk recording-reproducing apparatus according to the present invention.

FIG. 17 is a block diagram of an optical disk recording-reproducing apparatus 200 according to another embodiment of the present invention.

In the optical disk recording-reproducing apparatus 200, a multi-level data generator 16 supplies test patterns of all combination of given multi-level data to a recording waveform generator circuit 17. The recording waveform generator circuit 17 reads a recording correction table 15 and then supplies a recording pulse corresponding to a combination pattern from the multi-level data generator 16 to a laser driving circuit 18. The laser driving circuit 18 emits laser light from a semiconductor laser illuminant of an optical head 19 and projects the laser light to an information recording medium 20 so as to form a recorded mark.

When recorded information is reproduced, a light receiver of the optical head 19 catches reflection light from the information recording medium 20 and then the reflection light is converted into an electronic signal. The electronic signal is supplied to a waveform equalizer 12 via a reproduction signal amplifier 11. The waveform equalizer 12 determines the waveform equalizing coefficient so that the following formula can be minimized, $$\sum_{l,m,n=0}^{7} \{EQ(i\,|\,l, m, n) - EQ(i\,|\,m, m, m)\}^2. \tag{5}$$

The waveform equalizer 12 performs a waveform equalizing process for the electronic signal in accordance with the waveform equalizing coefficient and then supplies the processed electronic signal to a signal comparator 13. The signal comparator 13 compares the reproduction signal level with the target signal level so as to compute an error. If there is a combination pattern such that a difference between the reproduction signal level and the target signal level is larger than a predetermined value, an energy correction computing part 14 computes a correction amount of the laser energy and updates a recording correction table 15 based on the computed correction amount. The above-mentioned process is repeated until the difference becomes less than the predetermined value.

The multi-level information recording method according to the present invention intends to correct the level of the laser beam so that the optical disk recording-reproducing apparatus 200 can determine the optimal energy level of the laser beam as small iteration times as possible.

According to the multi-level information recording method, the optical disk recording-reproducing apparatus 200 records multi-level data sequences. Then, the optical disk recording-reproducing apparatus 200 performs the waveform equalizing process for the reproduction signal of the recorded multi-level data. After that, the optical disk recording-reproducing apparatus 200 repeats to correct the energy level of the laser beam until the difference Δ(i) between the processed reproduction signal level and the target signal level becomes less than a desired value.

Here, the target signal level means the value EQ(i|m, m, m), that is, the reproduction signal level of the case where the same multi-level data "m" are recorded three consecutive times.

A description will now be given of an initialization method of the laser beam.

As mentioned above, since the target signal level is the reproduction signal level of the case where same multi-level data "m" are recorded three consecutive times, the optical disk recording-reproducing apparatus 200 initially computes the target signal levels for each of multi-level data "0" through "7". Then, the optical disk recording-reproducing apparatus 200 sets the energy level of the laser beam so that each reproduction signal level can have approximate same interval to the adjacent reproduction signal levels. If the interval is supposed to be V, the approximate same interval means that the interval is within the range of V±0.2V.

Figure 18:
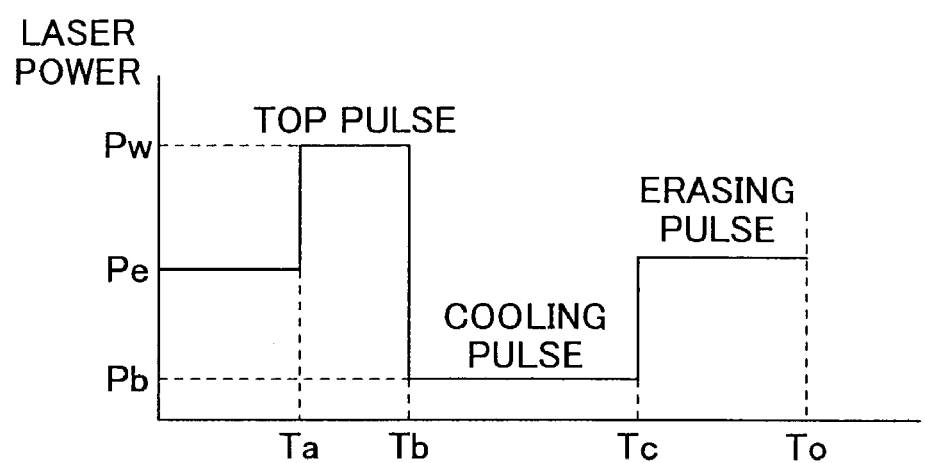
FIG. 18 is a diagram illustrating a waveform of a recording pulse.
Figure 19:
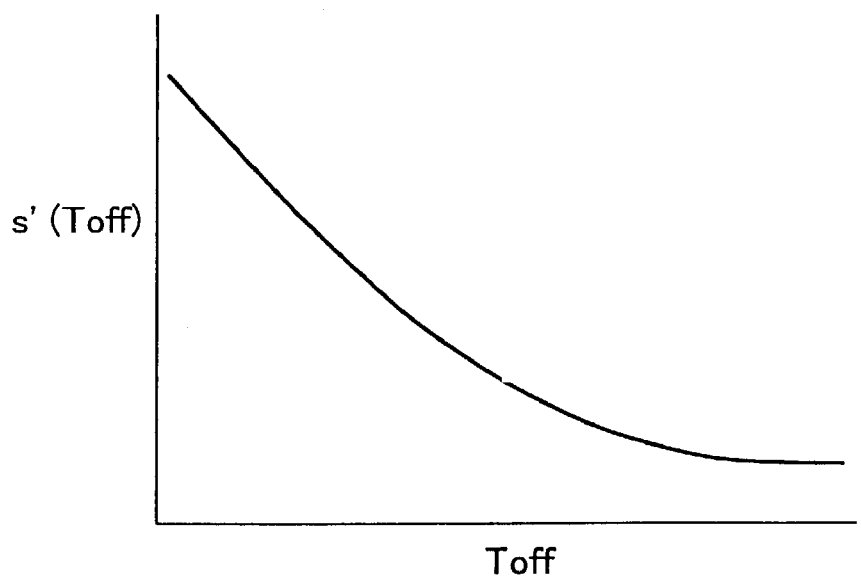
FIG. 19 is a diagram illustrating a waveform variation of a reproduction signal level before the waveform equalizing process is performed.

FIG. 18 shows the waveform of a recording pulse, and FIG. 19 shows the waveform variation of a reproduction signal level before the waveform equalizing process is performed.

The laser beam is controlled by adjusting the cooling pulse width Toff (=Tc−Tb). A reproduction signal level s'(i) before the waveform equalizing process varies in accordance with the level of Toff as shown in FIG. 19.

The multi-level 0, 1 and 2 of small recorded marks have larger deviations with respect to the signal level distributions than the other multi-level of large recorded marks. Therefore, if a large interval is assigned to the multi-level data of small recorded marks, it is possible to increase tolerance of the multi-level determination error.

In order to coincide the peak position of the reproduction signal waveform with the sampling position, an inter-symbol interference-free solitary wave, that is, the multi-level data sequence "00000100000200000 . . . ", is recorded to set laser radiation timings Ta, Tb and Tc. The optical disk recording-reproducing apparatus 200 uses the recording power and the length of the recording pulse as mentioned above.

The optical disk recording-reproducing apparatus 200 determines energy level of the laser beam for symmetrical multi-level data patterns "mnm" in the following fashion.

Figure 20:
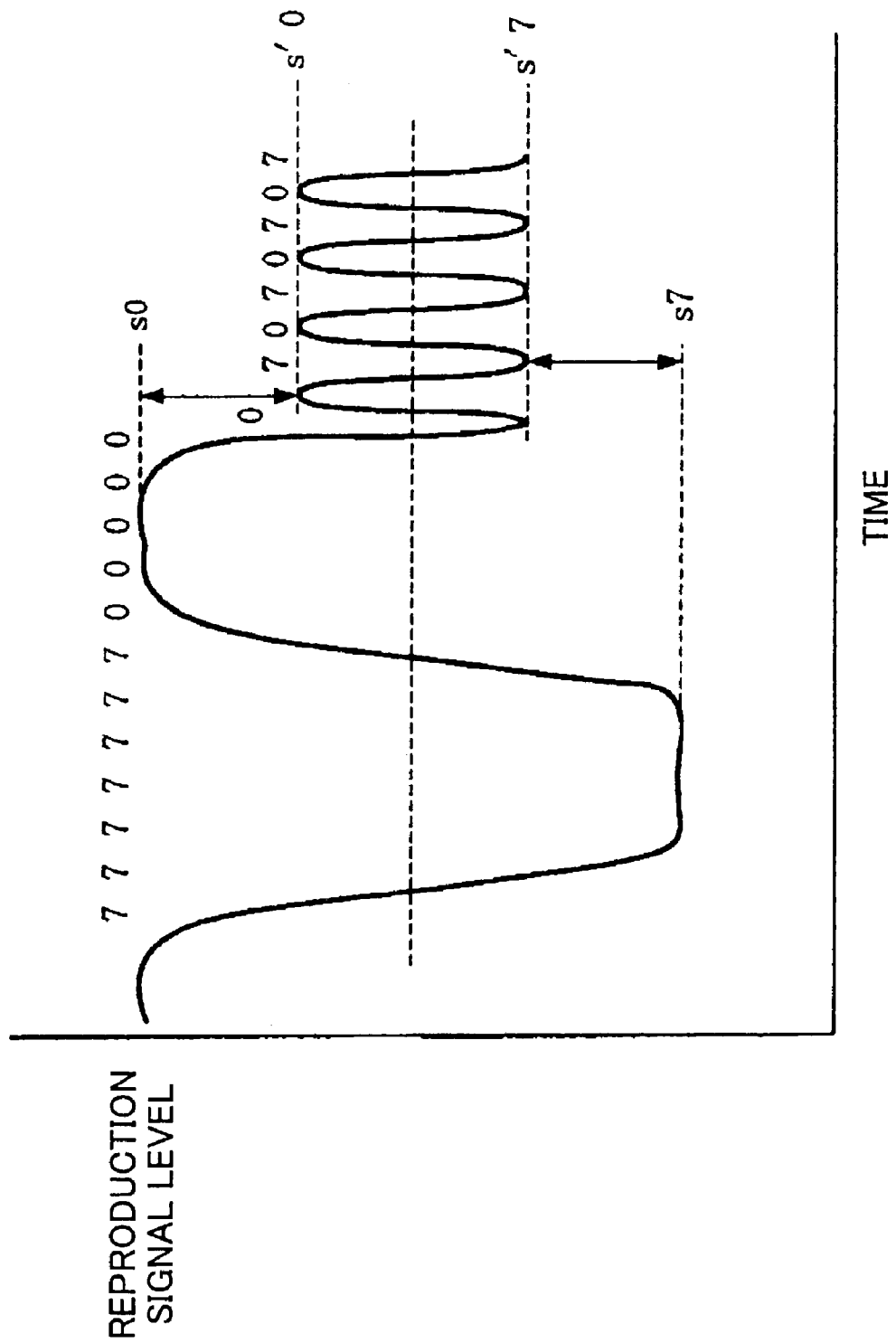
FIG. 20 is a diagram illustrating a waveform for explaining determination of an energy level of a laser beam for the symmetrical multi-level data patterns "mnm"

FIG. 20 shows a waveform diagram for explaining determination of an energy level of a laser beam for the multi-level data patterns "mnm". In FIG. 20, two multi-level data patterns "070" and "707" are illustrated.

As is shown in FIG. 20, the multi-level data "0" and "7" are consecutively recorded and subsequently the multi-level data pattern "070" is consecutively recorded. FIG. 20 shows the reproduction signal waveform in this case.

The notations s0 and s7 represent reproduction signal levels for the consecutive multi-level data "0" and "7", respectively. Also, the notation s'0 and s'7 represent the reproduction signal levels of the multi-level data "0" and "7" of a case where the multi-level data pattern "07" is iteratively recorded, respectively. After the waveform equalizing process is performed for the multi-level data patterns "070" and "707", the multi-level data patterns have the reproduction signal levels as follows;

$$EQ'(i|070)=s'7+C1(s'7-s'0)+C2(s'7-s'0)=s'7-(C1+C2)s'07, \text{ and}$$

$$EQ'(i|707)=s'1+C1(s'0-s'7)+C2(s'0-s'7)=s'0+(C1+C2)s'07,$$

where $s'70=s'0-s'7$.

Here, if the amplitude center of the continuous wave is coincided with the amplitude center of the repetitive wave, the following equations are obtained by the waveform equalizing process;

$$EQ'(i|070)=s0 \text{ and } EQ'(i|707)=s7.$$

On the other hand, if the amplitude center of the continuous wave is not coincided with the amplitude center of the repetitive wave, either of waveform-equalized reproduction signals deviates from the target signal levels.

Accordingly, the laser beam energy is found so that the amplitude center of the continuous wave can be approximately coincided with the amplitude center of the repetitive wave. Namely, the laser beam energy is determined so that the following inequality can be satisfied;

$$\delta C/(s0-s7) \leq |0.15|,$$

where $\delta C$ is a difference between the amplitude center of the continuous wave and the amplitude center of the repetitive wave.

The laser beam energy corresponding to the multi-level data patterns "mmm", "0m0" and "mnm" are initially set in the recording correction table 15. The optical disk recording-reproducing apparatus 200 sets the most approximate recording condition in the multi-level patters "mmm", "0m0" and "mnm" as the initial value for the other multi-level patterns.

If the initial condition of the laser beam energy is set in this fashion, it is possible to optimize the laser beam energy of all multi-level data combinations at smaller iteration times.

A description will now be given of a laser beam energy correction method according to this embodiment.

Figure 21:
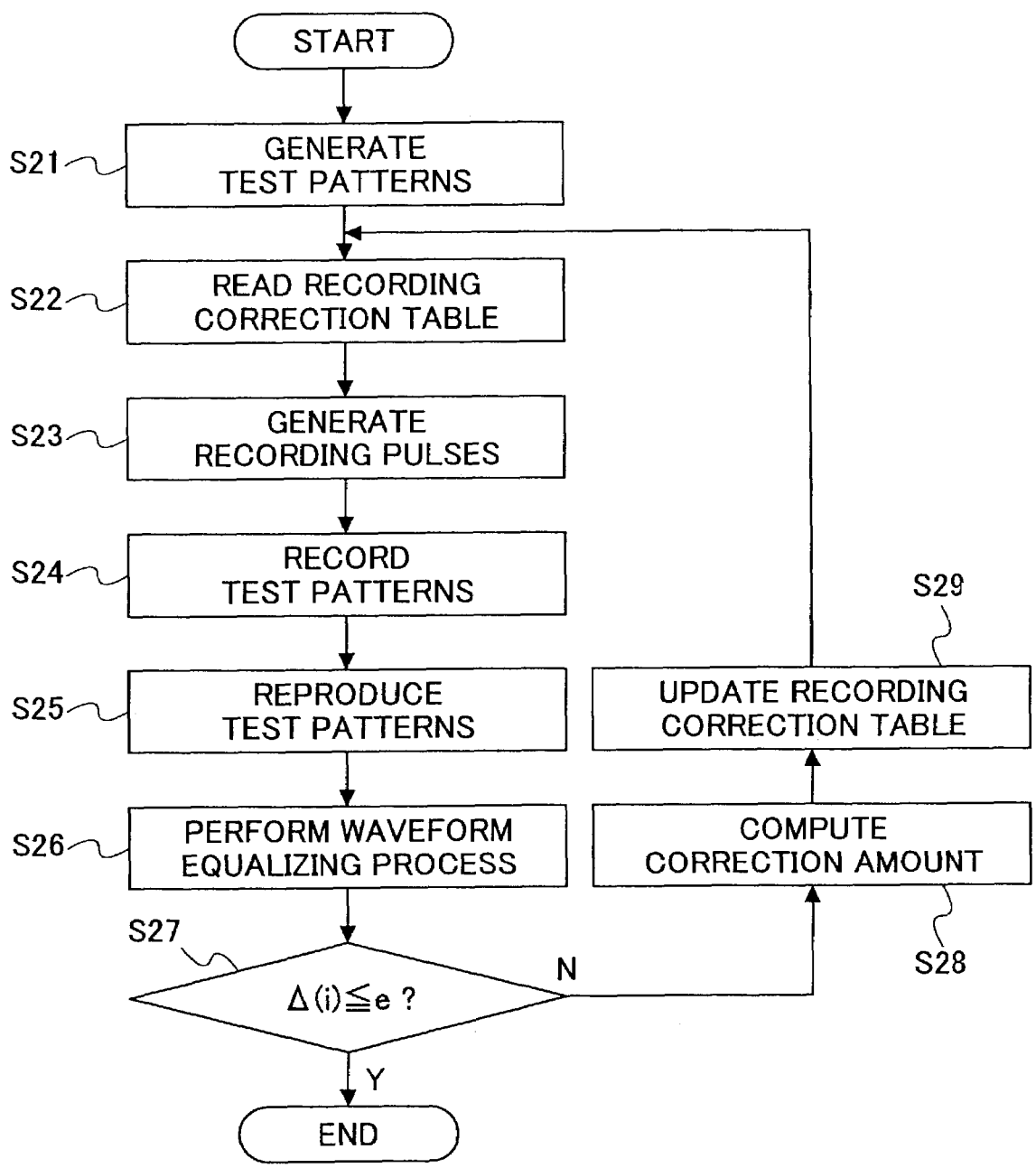
FIG. 21 is a flowchart of a multi-level information recording process performed by the optical disk recording-reproducing apparatus shown in FIG. 17.

FIG. 21 is a flowchart of a multi-level information recording process performed by the optical disk recording-reproducing apparatus 200 shown in FIG. 17.

In the multi-level information recording process, the optical disk recording-reproducing apparatus 200 generates test patterns of all combinations of three multi-level data at step S21. At step S22, the optical disk recording-reproducing apparatus 200 reads the recording correction table TABLE 5.

TABLE 5

| i − 1 | i | i + 1 | T1 | T2 | T3 |
|---|---|---|---|---|---|
| 0 | 0 | 0 | T1000 | T2000 | T3000 |
| 0 | 0 | 1 | T1001 | T2001 | T3001 |
| 0 | 0 | 2 | T1002 | T2002 | T3002 |
| . | . | . | . | . | . |
| l | m | n | T1lmn | T21mn | T31mn |
| . | . | . | . | . | . |
| 7 | 7 | 6 | T1776 | T2776 | T3776 |
| 7 | 7 | 7 | T1777 | T2777 | T3777 |

At step S23, the optical disk recording-reproducing apparatus 200 generates recording pulses corresponding combinations of three multi-level data. At step S24, the optical disk recording-reproducing apparatus 200 records the test patterns in an information recording medium. At step S25, the optical disk recording-reproducing apparatus 200 reproduces the recorded test patterns.

At step S26, the optical disk recording-reproducing apparatus 200 samples reproduction signals and then performs the waveform equalizing process for the sampled reproduction signals. Then, the optical disk recording-reproducing apparatus 200 extracts processed reproduction signal levels corresponding to combinations of multi-level data.

At step S27, the optical disk recording-reproducing apparatus 200 determines whether or not the difference $\Delta(i)$ between the processed reproduction signal level and the target signal level is less than a desired value or a predetermined value e. If $\Delta(i)>e$, the optical disk recording-reproducing apparatus 200 computes a correction amount of the laser beam energy at step S28. At step S29, the optical disk recording-reproducing apparatus 200 updates the recording correction table based on the correction amount and then returns to step S22.

The steps S22 through S29 are repeated until the inequality $\Delta(i) \leq e$ is satisfied for all combinations of three multi-level data.

In the multi-level information recording process, the reproduction signal levels are corrected to approach to the target signal levels. However, the difference $\Delta(i)$ depends on not only a difference between a designed shape and an actual shape of a recorded mark in a cell to be reproduced due to thermal interference but also differences between designed shapes and actual shapes of recorded marks in the adjacent cells.

Consequently, the optical disk recording-reproducing apparatus 200 corrects the reproduction signal level in accordance with the value $\Delta^{(h)}(i)$, where h is the number of iteration times. However, if the laser beam energy of the i-th multi-level data is corrected in the above fashion, the correction influences the values $\Delta^{(h+1)}(i+1)$ and $\Delta^{(h+1)}(i-1)$. Then, if the laser beam energy levels of the (i+1)-st and (i−1)-st multi-level data are corrected, the correction, in turn, influences the difference $\Delta^{(h+1)}(i)$. Therefore, it takes long time to find the optimal laser beam energy in this method.

In order to overcome the above-mentioned problem, a first and a second correction processes are performed. As mentioned above, the difference $\Delta(i)$ between the reproduction signal level and the target signal level is caused by not only a difference between a designed shape and an actual shape of a recorded mark in a cell to be reproduced due to thermal interference but also differences between designed shapes and actual shapes of recorded marks in the adjacent cells.

With this background, the first correction process intends to correct the difference between a designed shape and an actual shape of a recorded mark of the i-th multi-level data.

For instance, the target signal level EQ(i) and the reproduction signal level EQ'(i) are supposed as follows;

$EQ(i)=s(i)+C1\{s(i)-s(i-1)\}+C2\{s(i)-s(i+1)\}$ and, $EQ'(i)=s'(i)+C1\{s'(i)-s'(i-1)\}+C2\{s'(i)-s'(i+1)\}$.

Then, the difference $\Delta(i)$ is represented as follows;

$\Delta(i)=EQ(i)-EQ'(i)=(1+C1+C2)\{s(i)-s'(i)\}-C1\{s(i-1)-s'(i-1)\}-C2\{s(i+1)-s'(i+1)\}$.

It is supposed that $\delta(j)=s(j)-s'(j)$. Then, the difference $\Delta(i)$ is transformed as follows;

$\Delta(i)=(1+C1+C2)\delta(i)-C1\delta(i-1)-C2\delta(i+1)$. (6)

In the formula (6), the first term, the second term and the third term of the right side are differences between target signal level and the reproduction signal level before waveform equalizing process of the i-th multi-level data, the (i−1)-st multi-level data and the (i+1)-st multi-level data, respectively.

When the correction coefficient is notated as $\beta$, each contribution of $\delta(i)$, $\delta(i-1)$ and $\delta(i+1)$ to the total difference $\Delta(i)$ is given as follows;

$\delta(i):\beta(1+C1+C2)\delta(i)/(1+2C1+2C2)$, $\delta(i-1):\beta C1\delta(i-1)/(1+2C1+2C2)$, and $\delta(i+1):\beta C2\delta(i+1)/(1+2C1+2C2)$.

Accordingly, when the i-th multi-level data "m" are recorded, the following correction is performed.

The gradient of the curve in the vicinity of Toff that is used when the multi-level data "m" are recorded is notated as $\alpha(\text{Toff\_m})$ Then, $\Delta\text{Toff}(i)=\beta(1+C1+C2)\Delta(i)/(1+2C1+2C2)/\alpha(\text{Toff\_m})$. (7)

By using the equation (7), the correction amount in the recording correction table 15 is changed as follows;

$\Delta T1(i)=\Delta T2(i)=-\Delta\text{Toff}(i)/2$, and $\Delta T3(i)=\Delta\text{Toff}(i)/2$.

Then, since the center of the recording pulse is not misaligned, it is possible to record the recorded mark in the approximate center of the cell.

The laser beam energy of the multi-level data "m" in the multi-level data combination "lmn" is updated in accordance with the following formula and then test patterns are recorded again based on the following formula;

$T^{(h)}k(lmn)=T^{(h-1)}k(lmn)+\Delta T^{(h-1)}k(lmn)$, where k=1, 2, 3, and (h) represents the number of iteration times.

If areal-record density is increased, it is predicted that the waveform equalizing operation has to be performed for not only $s'(i\pm 1)$ but also $s'(i\pm 2)$ or further distant cells.

In the case where the waveform equalizing operation is performed for up to $s'(i\pm h)$, the number of taps of the waveform equalizer is set as (2h+1). In EQ(i) obtained based on the following formula (8), it is possible to perform recording correction in accordance with the waveform equalizing operation by setting the correction amount of the laser beam energy based on the following formula (9);

$$EQ(i) = \beta s'(i) + \sum_{j=-h}^{h} Cj\{s'(i) - s'(i-j)\}, \quad (8)$$

and $$\Delta \text{Toff}(i) = \beta(1 + \sum_{j=-h}^{h} C_j)\Delta(i)/(1 + 2\sum_{j=-h}^{h} |C_j|)/\alpha(m). \quad (9)$$

The above correction coefficient $\beta$ is set so that the correction of the laser beam energy can have maximal efficiency through the following processes (1) through (4).

(1) A known multi-level data sequence is recorded by the initial laser beam energy.

(2) Based on reproduction results, the waveform equalizing coefficient Ci is determined so that the value $\Sigma\Delta^2(i)$ can be minimized.

(3) Test patterns are recorded in accordance with variations of $\beta(0\leq\beta\leq 1)$, and the value $\Sigma\Delta^2(\beta=x|i)$ is computed. Then, the value $\beta$ is determined so that the formula $\Sigma\Delta^2(\beta=0|i)-\Sigma\Delta^2(\beta=x|i)$ can be maximized.

(4) By using the computed $\beta$, the above processes are repeated until the inequality $\Delta(i)\leq|e|$ is satisfied for all combinations of three multi-level data.

Next, a description will now be given of the second correction process. The second correction process intends to correct the energy level of the laser beam based on not only $\Delta(i)$ but also $\Delta(i-1)$ and $\Delta(i+1)$ when multi-level data are recorded in the i-th cell.

For instance, if the following two inequalities (10) and (11) are satisfied for the values $\Delta^{(h)}(i)$, $\Delta^{(h)}(i+1)$ and $\Delta^{(h)}(i-1)$;

$\Delta^{(h)}(i+1)\leq|e|$ (10), and $\Delta^{(h)}(i)=ei>|e|$ (11)

the first correction process can record test patterns by correcting only the laser beam energy of the multi-level data in the i-th cell without any correction regarding the (i−1)-st cell and the (i+1)-st cell.

In this case, however, although the difference $\Delta^{(h|1)}(i)$ is corrected by decreasing the difference, there is a probability that inter-symbol interference increases errors regarding the differences $\Delta^{(h+1)}(i-1)$ and $\Delta^{(h+1)}(i+1)$ due to the change of $s'^{(h+1)}(i)$. As a result, it becomes necessary to increase the iteration times so as to satisfy the convergence inequality $\Delta(i) \leq |e|$.

In order to overcome the above-mentioned problem, when multi-level data are recorded in the i-th cell, the optical disk recording-reproducing apparatus 200 corrects the laser beam energy in the second correction method by taking into consideration of not only $\Delta(i)$ but also $\Delta(i-1)$ and $\Delta(i+1)$ The second correction process is performed in accordance with the following formula (12) when the waveform equalizing process covers up to $s'(i\pm h)$;

$$\Delta Toff(i)=\beta\{(1+C1+C2)\Delta(i)+C1\Delta(i-1)+C2\Delta(i+1)\}/(1+2C1+2C2)/\alpha(Toff\_m) \quad (12).$$

Namely, the waveform equalizing process is performed in accordance with the following formula (13) when the number of taps of the waveform equalizer is set as (2h+1).

$$\Delta Toff(i) = \beta[1 + \sum_{j=-h}^{h} Cj\{\Delta(i) + \Delta(i+j)\}](1 + 2\sum_{j=-h}^{h} |Cj|)/\alpha(m). \quad (13)$$

When the optical disk recording-reproducing apparatus 200 uses a 3-tap waveform equalizer in the second correction process, the laser beam energy is set in the recording correction table corresponding to combinations of five multi-level data.

The above description has handled the case where the laser beam energy is controlled by adjusting the cooling pulse width. However, even if $\Delta Toff(i)$ is replaced with $\Delta Pw(i)$ and $\Delta Pw/Pe(i)$ or a combination of $\Delta Toff$, $\Delta Pw(i)$ and $\Delta Pe(i)$, the second correction process can achieve the same effect as the above description.

A description will now be given of an optical disk as an information recording medium according to the present invention wherein the optical disk 150 can be used in the optical disk recording-reproducing apparatus 200 shown in FIG. 17.

As is shown in FIG. 14, the information recording medium 150 is formed by sequentially layering a dielectric film, a phase-change recording film, a dielectric film and a reflection film on a substrate. The information recording medium is a phase-change optical disk in which multi-level information can be recorded by using a laser beam of the wavelength 650 nm. The substrate is formed of a polycarbonate of the diameter 120 mm and the thickness 0.6 mm. Grooves are formed on the substrate surface by injection molding. The grooves are densely provided in a spiral form between the inner circumference and the outer circumference at the track pitch of 0.74 μm.

An objective lens of the wavelength 650 nm and NA 0.65 is used to record and reproduce information in the information recording medium. In 8-level recording, information is recorded under the condition of the recording linear speed 6.0 m/s, the cell length 0.48 μm, the laser power Pe=8 mW, Pw=15 mW, and Pb=0.1 mW. Then, $8^3(=512)$ test patterns are prepared.

The information recording medium has the reflection light intensity having the Toff dependency as shown in FIG. 19. Based on the waveform data in FIG. 19, the value $\alpha(m)$ is determined for the multi-level data "m" to be recorded. Also, when the multi-level data "m" are recorded under the initial recording condition, the waveform equalizing coefficients C1 and C2 become 0.1 and 0.18, respectively.

Figure 22:
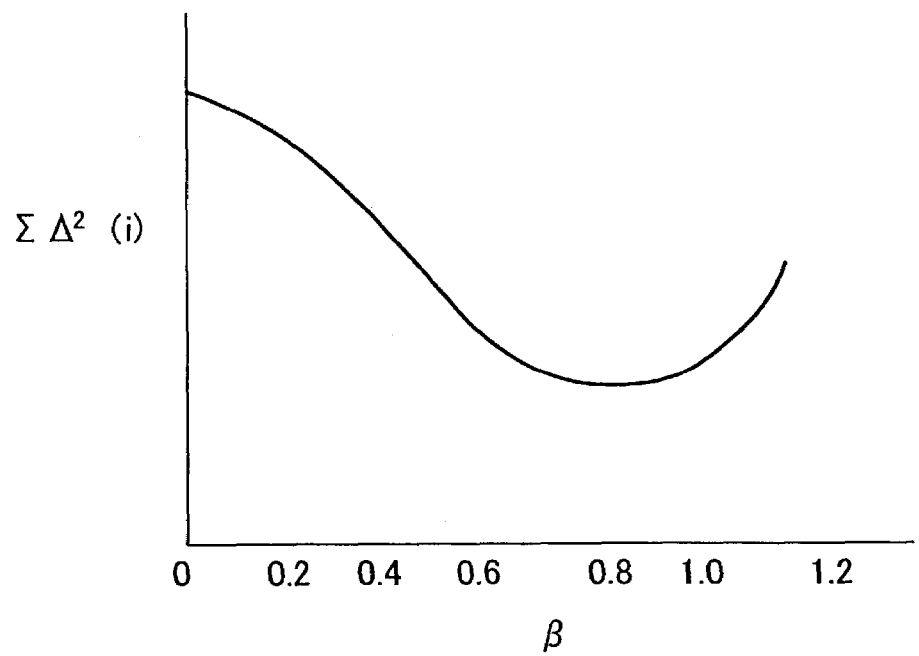
FIG. 22 is a diagram illustrating a waveform of variations of $\Sigma\Delta(i)^2$ for the parameter $\beta$.

When the parameter β is varied in the range $0.2 \leq \beta \leq 0.8$, the value $\Sigma\Delta(i)^2$ is varied as shown in FIG. 22.

As is shown in FIG. 22, the value $\Sigma\Delta(i)^2$ is minimized at β=0.8. Therefore, the recording correction process is repeated until the inequality $\Delta(i) \leq |e=0.005|$ is satisfied for β=0.8. If the recording correction process is repeated 30 times through 40 times, the inequality $\Delta(i) \leq |e=0.005|$ is satisfied for all 512 combinations. Here, the parameter e is set as the standard deviation of groove level having no information.

In this fashion, if the control data Pw, Pe, Pb, T1, T2, T3, α, β and waveform equalizing coefficients are stored in advance and the optical disk recording-reproducing apparatus 200 uses the control data to correct the laser beam energy, it is possible to optimize the energy level of the laser beam in shorter time.

Here, if ΔToff is optimized based on the following formula (14) for comparison;

$$\Delta Toff=\beta\Delta(i)/\alpha \quad (14),$$

it is necessary to repeat the recording correction 70 times through 80 times until the inequality $\Delta(i) \leq |e=0.005|$ is satisfied.

A description will now be given of another correction process of the optical disk recording-reproducing apparatus 200 in FIG. 17.

In the correction process, the energy level of the laser beam is corrected similarly to the above-mentioned information recording medium and the initial value of the laser beam energy. In this correction process, it is possible to satisfy the inequality $\Delta(i) \leq |e=0.005|$ for all 512 combinations of three multi-level data by repeating the recording correction process 10 times through 20 times.

Figure 23:
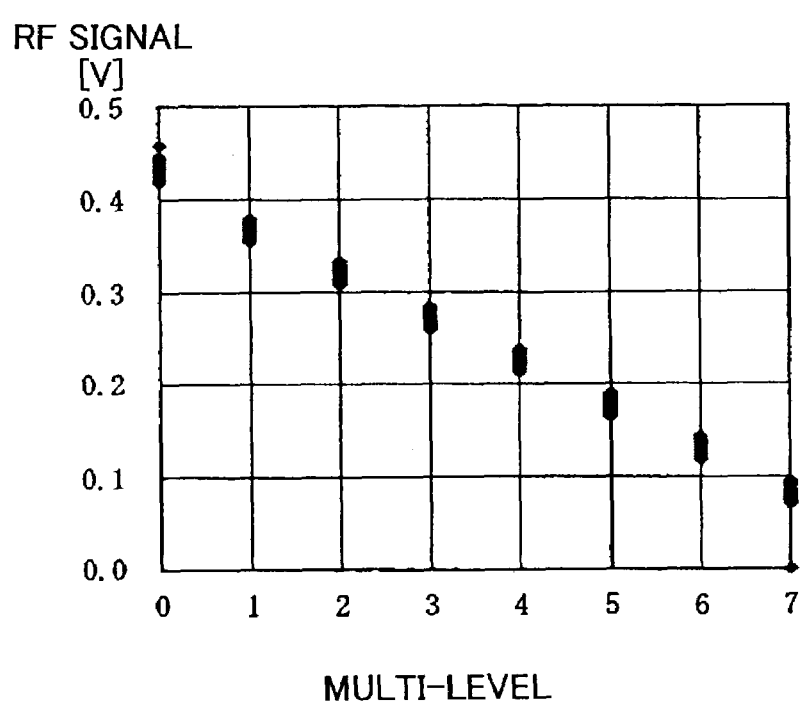
FIG. 23 is a distribution graph illustrating reproduction signals after a waveform equalizing process.
Figure 24:
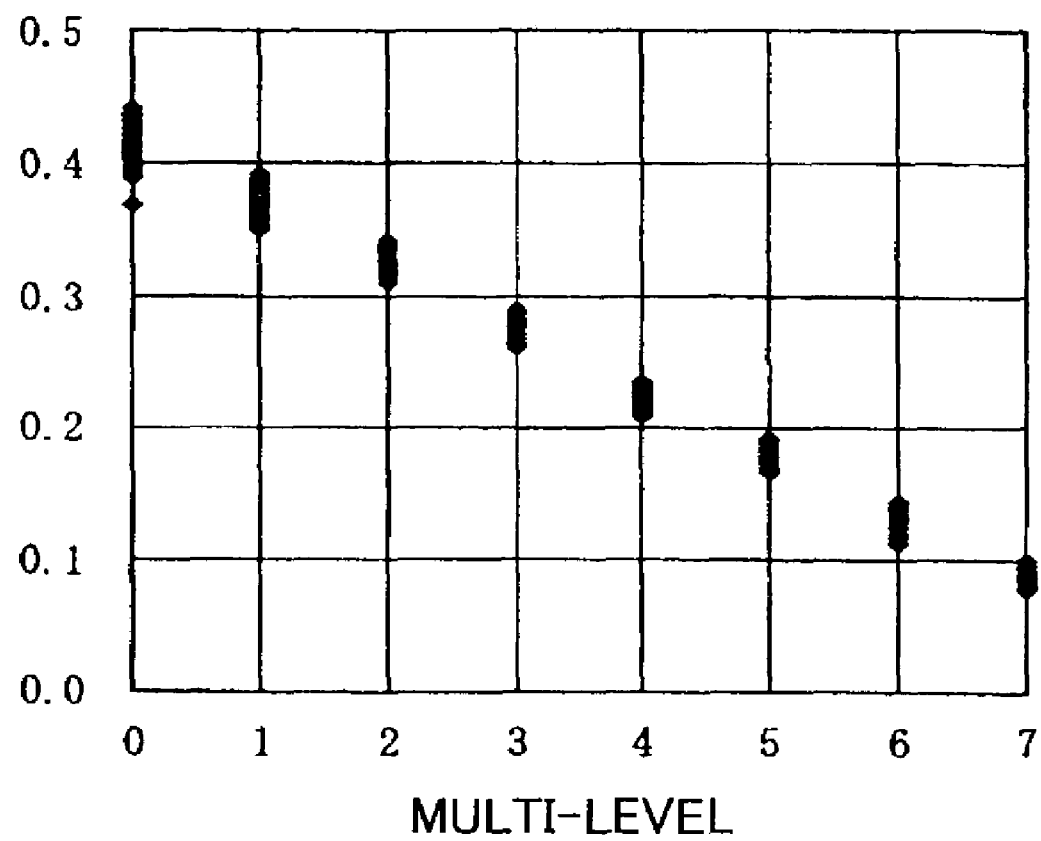
FIG. 24 is another distribution graph illustrating reproduction signals after a waveform equalizing process.

FIG. 23 and FIG. 24 show signal level distributions after the waveform equalizing operation.

As is shown in FIG. 23 and FIG. 24, after the optical disk recording-reproducing apparatus 200 according to this embodiment performs the waveform equalizing process, the overlapping areas between adjacent multi-level data disappear in comparison with signal level distributions without any correction process. According to the correction process, it is possible to reduce the multi-level determination error from 2.1% to 0.1%.

In this fashion, according to the above-mentioned multi-level information recording method, the recording correction is performed in accordance with the differences between the target signal levels and the reproduction signal levels and the waveform equalizing coefficients, it is possible to optimize the laser beam energy for combinations of multi-level data at smaller iteration times.

Additionally, since the recording correction process is performed in accordance with the differences between the target signal levels and the reproduction signal levels of adjacent cells and the waveform equalizing coefficients, it is possible to optimize the laser beam energy for combinations of multi-level data at smaller iteration times.

Additionally, since known multi-level data sequences include at least all combinations of three multi-level data, it is possible to determine the laser beam energy corresponding to all combinations of multi-level data at smaller iteration times.

Additionally, since correction coefficients are determined so that the laser beam energy can have the maximal correction effect, it is possible to optimize the laser beam energy for individual combinations of multi-level data at smaller iteration times.

Additionally, when the laser beam energy is set corresponding to combinations of at least three multi-level data, it is possible to implement the above-mentioned information recording method.

Additionally, since the laser beam energy is controlled based on either or a combination of the recording power, the erasing power, the bias power, the radiation time and the radiation timing of the laser beam, it is possible to easily control the laser beam energy.

Additionally, when the initial laser beam energy is set in the above-mentioned fashion, it is possible to optimize the laser beam energy for all combinations of three multi-level data at smaller iteration times.

Additionally, since intervals between individual reproduction signal levels are arranged based on deviations of the reproduction signal level distributions, it is possible to extend tolerance of the multi-level determination error.

Additionally, when a phase-change optical disk is used as the information recording medium according to the present invention, it is possible to form recorded marks with high accuracy.

According to the multi-level information recording-reproducing method, since the recording correction process is performed in accordance with the differences between the target signal levels and the reproduction signal levels and the waveform equalizing coefficients, it is possible to optimize the laser beam energy for individual combinations of multi-level data at smaller iteration times.

A description will now be given of another multi-level information recording method according to the present invention. The multi-level information recording method intends to overcome the above-mentioned erroneous determination caused by the fact that conventional multi-level information recording methods have only one threshold for multi-level determination. In the multi-level information recording method according to the present invention, multi-level distributions are classified for each level of multi-level data immediately before a cell to be reproduced. Then, radiation energy level is corrected so that each multi-level distribution cannot be overlapped with adjacent multi-level distributions, and multi-level information is recorded by using a recording parameter as mentioned later.

A detailed description will now be given, with reference to FIGS. 25A and 25B, of the multi-level information recording method according to the present invention wherein four 4-level data "0", "1", "2" and "3" are prepared as an example.

Figure 25A:
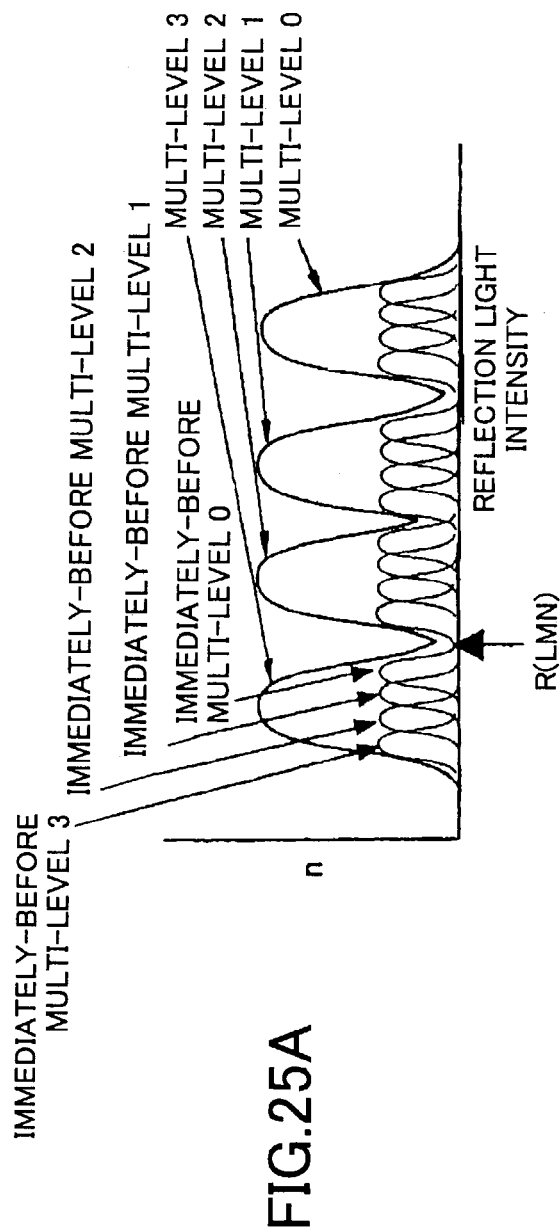
FIGS. 25A and 25B are distribution graphs illustrating multi-levels and immediately-before multi-levels.
Figure 25B:
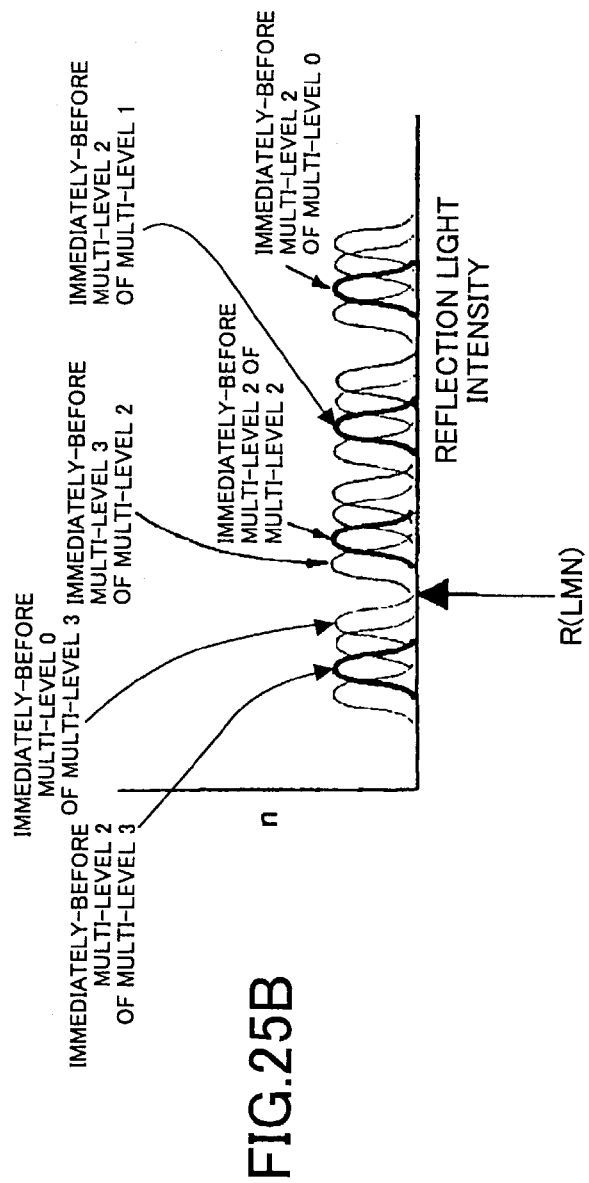

As is shown in FIGS. 25A and 25B, each multi-level distribution is formed by synthesizing signal level distributions of all immediately-before multi-levels 0 through 3. As is shown in FIG. 25A, when a recorded mark is recorded at a short interval between the recorded mark and an adjacent recorded mark, the multi-level distribution also has a short interval between the multi-level distribution and the adjacent multi-level distribution. As a result, overlapped areas are formed in bottoms between adjacent multi-level distributions. For instance, when distributions of immediately-before multi-level 2 are extracted for the multi-level 0 through 3 as shown in FIG. 25B, the optical disk recording-reproducing apparatus according to this embodiment corrects radiation energy so that each deviation of the distributions can be minimized and each average of the levels can be arranged at an equal interval. Then, the multi-level information recording-reproducing apparatus sets recording parameters for recording multi-level information.

When multi-level information is recorded in accordance with the recording parameters, it is possible to accurately determine multi-level with reference to the immediately-before multi-level even if the multi-level has a wide distribution as a whole. For instance, it is supposed that the intensity of reflection light (reproduction signal level) from the multi-level data "M" is R(LMN) in the multi-level data sequence LMN. Since the reflection light intensity R(LMN) lies between the distributions of the multi-levels 2 and 3 as shown in FIG. 25A, it is difficult to accurately determine the level for the reflection light intensity R(LMN). There is a high probability that the level is erroneously determined. As is shown in FIG. 25B, when the multi-level 2 has the immediately-before multi-level 3 or the multi-level 3 has the immediately-before multi-level 0, the optical disk recording-reproducing apparatus can determine intensity of the reflection light around R(LMN) with high probability. Therefore, if the optical disk recording-reproducing apparatus obtains multi-level of the immediately-before multi-level data "L", it is possible to accurately determine the multi-level of the multi-level data "M".

In order to obtain the immediately-before multi-level, the optical disk recording-reproducing apparatus inserts a certain pattern that can certainly determine multi-level such as "000003333300000" into the head of recorded data in an appropriate interval. It is noted that the reflection light can have maximal or minimal intensity with respect to the multi-level data sequence "000003333300000". If the certain pattern is inserted, it is possible to prevent propagation of the determination error. Also, when the immediately-before multi-level is used to determine multi-level, it is possible to reduce the determination error. Here, a multi-level may be determined based on the immediately-after multi-level rather than the immediately-before multi-level. Also, a multi-level may be determined based on both the immediately-before multi-level and the immediately-after multi-level. In this case, although it requires more tasks to execute the multi-level determination process, it is possible to more accurately determine the multi-level.

A description will now be given, with reference to FIG. 26, of a recording parameter setting process for setting a recording parameter for recording multi-level information in the multi-level information recording-reproducing apparatus according to this embodiment.

Figure 26:
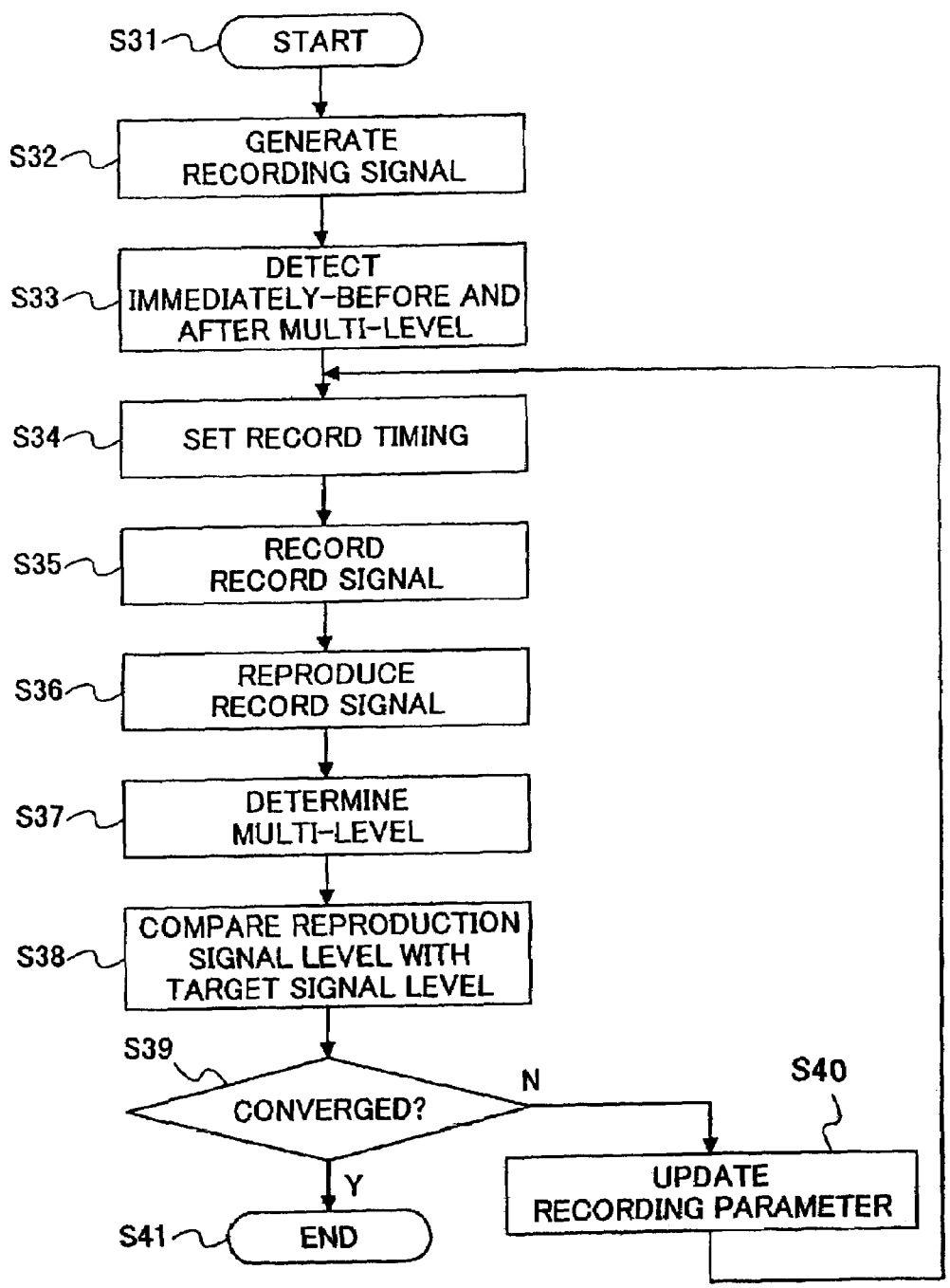
FIG. 26 is a flowchart of a recording parameter setting process by another optical disk recording-reproducing apparatus according to the present.

FIG. 26 is a flowchart of the recording parameter setting process. In the recording parameter setting process, the multi-level information recording-reproducing apparatus experimentally records known test patterns of multi-level data. When the multi-level information recording-reproducing apparatus detects a difference between a reproduction signal level and a target signal level, the multi-level information recording-reproducing apparatus adjusts recording parameters. Then, the multi-level information recording-reproducing apparatus repeats to record the test patterns until the difference is less than a predetermined value. As a result, it is possible to set the recording parameters that can reduce the determination error.

In details, as is shown in the flowchart in FIG. 26, the multi-level information recording-reproducing apparatus is started at step S31. At step S32, the multi-level information recording-reproducing apparatus generates a recording signal for forming a recorded mark. Here, the recording signal includes the test patterns. At step S33, the multi-level information recording-reproducing apparatus detects multi-level signals before and after the record signal. At step S34, the multi-level information recording-reproducing apparatus sets timings of laser radiation corresponding to the detected multi-level signals. At step S35, the multi-level information recording-reproducing apparatus records the record signal. At step S36, the multi-level information recording-reproducing apparatus reproduces the recorded record signal. At step S37, the multi-level information recording-reproducing apparatus makes primary determination of multi-level of the recorded record signal and classifies the multi-level based on the immediately-before multi-level. At step S38, the multi-level information recording-reproducing apparatus compares a multi-level of the reproduction multi-level signal, that is, the reproduction signal level, with a target signal level mentioned in detail later. At step S39, the multi-level information recording-reproducing apparatus determines whether or not a comparison result is less than a predetermined value and then the recording parameter setting process is terminated.

If the comparison result is more than the predetermined value, the multi-level information recording-reproducing apparatus corrects the radiation energy at step S40. At step S40, the multi-level information recording-reproducing apparatus rewrites a correction table 57 of the laser radiation energy. Then, the multi-level information recording-reproducing apparatus computes and updates the recording parameters. After that, the multi-level information recording-reproducing apparatus returns to step S34.

In contrast, if the comparison result is less than the predetermined value, the multi-level information recording-reproducing apparatus does not have to correct the radiation energy and then the recording parameter setting process is terminated. In this fashion, step S34 through step S39 are repeated as the process for recording the test patterns until the differences between the reproduction signal levels and the target signal levels become less than the predetermined value. Then, after the recording parameter setting process is completed, the properly recording parameter is set to the multi-level information recording-reproducing apparatus. Here, the recorded test patterns are formed of known multi-level data sequences. Therefore, when the test patterns are compared with multi-level data sequences determined from the reproduction signals, it is possible to obtain the determination error.

When the recording parameter setting process is performed, it is possible to accurately determine the multi-level even if recording density is increased.

As a result, the multi-level information recording-reproducing apparatus can form recorded marks similar to the target signal level for all patterns and can accurately reproduce recorded multi-level information. Additionally, since the multi-level information recording-reproducing apparatus makes the primary determination of multi-level so as to find candidates of multi-levels, the multi-level information recording-reproducing apparatus can determine the multi-level more accurately than conventional threshold determination methods, which are to be mentioned later, under a condition where the multi-level information recording-reproducing apparatus has an equal SDR (Sigma to Dynamic Ratio) as the conventional threshold determination methods.

For instance, the target signal level may be set as the average of immediately-before multi-levels. In the above-mentioned 4-level recording, the target signal level of the multi-level j having immediately-before multi-level i is set as the signal level of the pattern "ij2".

Figure 27:
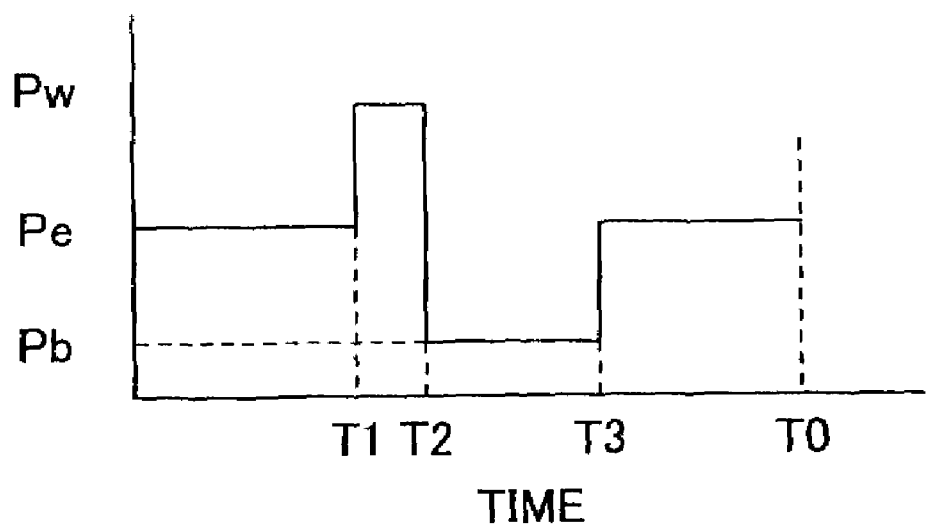
FIG. 27 is a diagram illustrating an example of a laser beam waveform for forming a recorded mark in a multi-level information recording method according to the present invention.

FIG. 27 shows an example of a laser beam waveform for forming a recorded mark in the multi-level information recording method according to the present invention. In this example, it is supposed that a multi-level information recording medium is formed of a rewritable phase-change optical disk and the recording track is in a crystal state. The reference recording time is set as T0. Time points T1, T2 and T3 and laser power items Pe, Pw and Pb are set corresponding to recorded multi-levels. When a laser beam of the waveform shown in FIG. 27 is radiated to an optical disk as the multi-level information recording medium according to the present invention, the laser power Pe is radiated by the time point T1 so as to erase a recorded mark from the recording film. From T1 to T2, the stronger laser power Pw than Pe is radiated so as to form a recorded mark. From T2 to T3, the weaker laser power Pb than Pe is radiated so as to cool the optical disk. After T3, the laser power Pe is radiated again so as to erase another recorded mark.

The size of such a recorded mark depends on the time points T1, T2 and T3 serving as timings of the laser radiation. Thus, it is possible to suppose T1, T2 and T3 as recording parameters.

In the above-mentioned multi-level information recording method, the ON/OFF timings of the laser beam is switched by controlling the time points T1, T2 and T3 or the laser power Pe and Pw. Consequently, the laser radiation energy is controlled by adjusting the waveform pattern for forming a recorded mark. In this fashion, it is possible to easily control the size of the recorded mark so that deviations of signal distributions can be minimized for individual immediately-before multi-levels. When the laser beam waveform is used, it is possible to form and erase a recorded mark simultaneously. Furthermore, if T1, T2 and T3 are appropriately set, it is possible to form a recorded mark smaller than the diameter of the laser beam spot. Additionally, since the waveform pattern of a recorded mark is recorded in the order; erasing power, recording power, cooling power and erasing power, the multi-level information recording-reproducing apparatus can form a new recorded mark while the multi-level information recording-reproducing apparatus erases an existing recorded mark.

Test patterns can be recorded in an area other than a user data area where a user records and reproduces data, for instance, an inner circumference area of a multi-level information recording medium. Then, it is possible to store the radiation energy information without use of the user data area.

Figure 28:
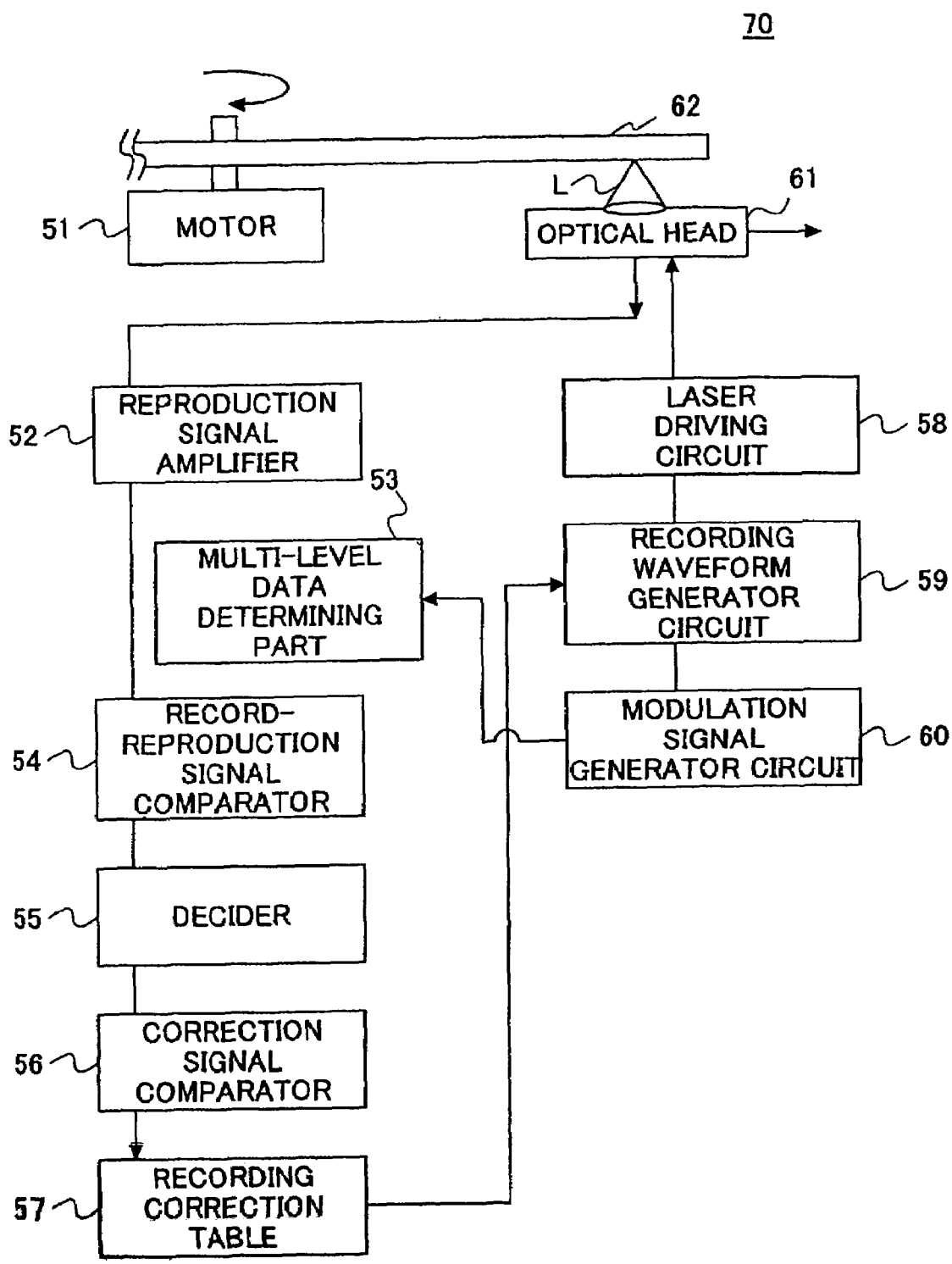
FIG. 28 is a block diagram illustrating the structure of the optical disk recording-reproducing apparatus according to the present invention.

A description will now be give, with reference to FIG. 28, of an optical disk recording-reproducing apparatus 70 as another embodiment of the multi-level information recording-reproducing apparatus according to the present invention. In the block diagram of FIG. 28, the optical disk recording-reproducing apparatus 70 comprises a motor 51 rotating an optical disk 62 as a multi-level information recording medium, a reproduction signal amplifier 52, a multi-level data determining part 53, a record-reproduction signal comparator 54, a decider 55, a correction signal comparator 56, a recording correction table 57, a laser driving circuit 58, a recording waveform generator circuit 59, a modulation signal generator 60 and an optical head 61.

The optical disk recording-reproducing apparatus 70 implements the multi-level information recording-reproducing method as follows.

First, the modulation signal generator 60 supplies test patterns of all combinations of given multi-level data to the multi-level data determining part 53. The multi-level data determining part 53 classifies the test patterns into multi-level data to be recorded and multi-level data immediately before and after the multi-level data to be recorded. Then, the multi-level information recording-reproducing apparatus reads setting of the laser radiation energy corresponding to the multi-level data to be recorded with reference to the recording correction table 57 and instructs the recording waveform generator 59 to generate a recording waveform in accordance with the setting. When the laser driving circuit 58 receives the recording waveform, the laser driving circuit 58 causes a semiconductor laser of the optical head 61 to emit a laser beam. The optical head 61 condenses the laser beam on the optical disk 62 so as to form a recorded mark on the optical disk 62 and record a multi-level signal.

On the other hand, the optical disk recording-reproducing apparatus 70 reproduces the recorded multi-level information as follows.

First, laser light is radiated on the optical disk 62, and a light receiver of the optical head 61, which is not illustrated in FIG. 28, catches reflection light of the laser light. The reflection light is converted into an electronic signal. The reproduction signal amplifier 52 amplifies the electronic signal and supplies the amplified electronic signal to the record-reproduction signal comparator 54. The record-reproduction comparator 54 compares the level of the electronic signal, that is, the reproduction signal level, with the corresponding target signal level. Based on comparison results, the-decider 55 computes a difference between the reproduction signal level and the target signal level. If the difference is more than a predetermined value, the optical disk recording-reproducing apparatus 70 rewrites the recording correction table 57 so as to correct the laser radiation energy corresponding to the test pattern. The above processes from the signal recording process to the rewriting process of the correction table 57 are repeated in accordance with the above-mentioned flowchart in FIG. 26 until the difference becomes less than the predetermined value. According to the optical disk recording-reproducing apparatus, it is possible to obtain the optimal laser radiation energy and form a recorded mark whose multi-level can be accurately determined.

A description will now be given, with reference to FIG. 29, of the structure of the optical disk 62 serving as the multi-level information recording medium according to the present invention.

Figure 29:
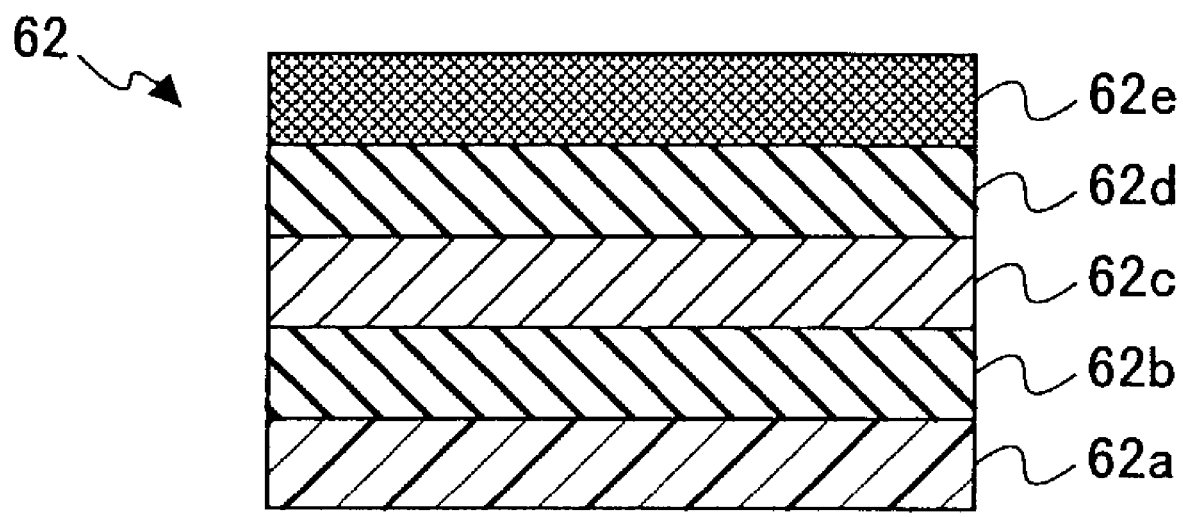
FIG. 29 is a diagram illustrating the structure of an optical disk according to an embodiment of the present invention.

As is shown in FIG. 29, the optical disk 62 is formed of a phase-change optical disk in which information is recorded by using a laser beam of the waveform 650 nm. The optical disk 62 comprises a substrate 62a, a dielectric film 62b, a recording film 62c, a dielectric film 62d and a reflection film 62e.

The substrate 62a is formed of a polycarbonate of the diameter 120 mm and the thickness 0.6 mm. Grooves are formed on the substrate surface by injection molding. The grooves have the width about 0.35 μm and the depth about 40 nm and are densely formed in a spiral form between the inner circumference and the outer circumference at the track pitch 0.74 μm. The phase-change optical disk 62 is formed by sequentially layering the dielectric film 62b, the recording film 62c, the dielectric film 62d and the reflection film 62e on the substrate 62a.

The optical disk recording-reproducing apparatus 70 uses an objective lens of the wavelength 650 nm and NA 0.65 to record and reproduce multi-level data in the optical disk 62. In this embodiment, multi-level information is recorded at the recording linear speed 3.5 m/s, the cell length 0.48 μm (T0=137 ns) and the laser power Pe=8 mW, Pw=15 mW and Pb=0.1 mW. Here, 512(=$8^3$) combinations are prepared as test patterns.

A description will now be given of recording parameters for recording the test patterns.

The recording parameters T1, T2 and T3 are set for each test pattern of three multi-level data "L", "M" and "N". If the multi-level has 8 values 0, 1, 2, 3, 4, 5, 6 and 7, 512 recording parameters are provided corresponding to the test patterns as shown in FIG. 30.

The notation S(LMN) represents a signal level when "M" of the multi-level data sequence "LMN" is reproduced, and the notation S0(LMX) represents a target signal level obtained by the following equation;

$$S0(LMX)=\{S(LM0)+S(LM1)+S(LM2)+S(LM3)+S(LM4)+S(LM5)+S(LM6)+S(LM7)\}/8.$$

Then, the difference $\delta(LMN)=S0(LMX)-S(LMN)$ is computed. If $\delta(LMN)>e$ (a predetermined value), the recording parameters are changed so that the difference $\delta(LMN)$ can become less than e.

For instance, the recorded parameters T1(LMN), T2(LMN) and T3(LMN) are updated as follows;

$$T1'(LMN)=T1(LMN)+\Delta T1,$$

$$T2'(LMN)=T2(LMN)+\Delta T2, \text{ and}$$

$$T3'(LMN)=T3(LMN)+\Delta T3.$$

In the above equations, $\Delta Ti$ (i=1, 2, 3) are changed by a predetermined amount in accordance with signs of $\delta(LMN)$, or $\Delta Ti$ is set as $\alpha i \delta(LMN)$ ($\alpha i$: constant).

The differences $\delta(LMN)$ are computed for all 512 combinations of three multi-level data. After the recording parameters are updated as mentioned above, the updated recording parameters are used to record the test patterns again. Subsequently, the above-mentioned process is repeated until $\delta(LMN)$ is less than e for all combinations. In the above description, T1, T2 and T3 are used as the recording parameters. However, Pw, Pe and Pb may be used as the recording parameters.

In this fashion, the recording parameters T1, T2 and T3 shown in FIG. 27 are corrected in accordance with the immediately-before multi-level so that the differences of the signal level distributions can be minimized. Here, the immediately-after multi-level or both of the immediately-before and after multi-levels may be used instead of the immediately-before multi-level.

Figure 31:
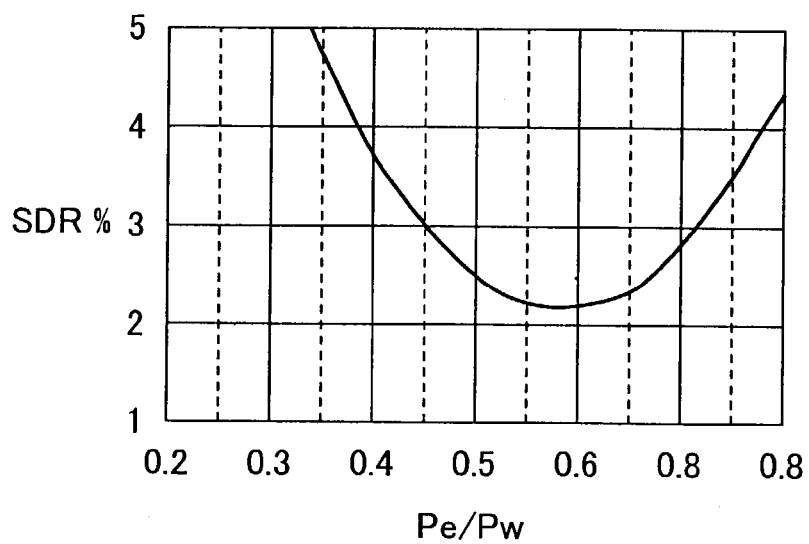
FIG. 31 is a graph of a SDR measurement result with respect to laser power Pe/Pw.

FIG. 31 shows a correction result according to the above-mentioned recording parameters. The horizontal axis SDR represents a ratio of multi-level differences to a dynamic range DR, that is, $$SDR=(\Sigma \sigma i/8)/DR.$$

When SDR=2.2%, it is possible to obtain $10^{-5}$-order BER (Bit Error Rate). In this level of BER, the optical disk recording-reproducing apparatus 70 can be used in practice if some error correction processes are provided therein. If BER of the multi-level information recording-reproducing method according to the present invention is compared with BER of conventional threshold determination methods, it is concluded that the multi-level information recording-reproducing method can decrease BER at approximate 10% because the multi-level is determined by selecting candidates of the multi-levels based on the immediately-before multi-levels. Thus, the multi-level information recording-reproducing method can achieve low BER even in high density recording where SDR cannot be suppressed. Additionally, since recorded marks are formed on the optical disk 62 by using radiation energy in accordance with adjacent multi-level information, it is possible to determine the multi-level with high accuracy.

Figure 32:
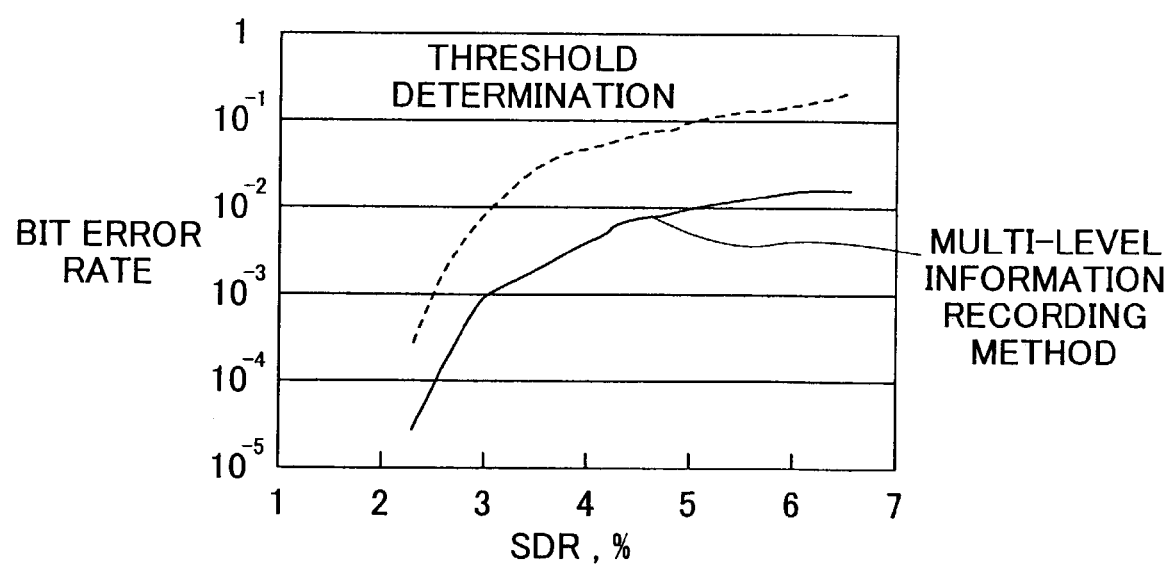
FIG. 32 is a comparison graph of performance of a threshold determination and the multi-level information recording method according to the present invention.

A description will now be given, with reference to FIG. 32, of measurement results of BER in comparison with a threshold determination method when the optical disk recording-reproducing apparatus 70 records test patterns in the optical disk 62 by varying the laser power Pe/Pw.

When the laser power Pe/Pw is small, the recording film does not reach the crystallization temperature due to the weak erasing power. As a result, it is impossible to crystallize amorphous marks and form recorded marks smaller than the diameter of a desired recording beam. On the other hand, when the laser power Pe/Pw is large, recorded marks are formed extensively in the radius direction and thereby harmful cross talk, which influences the reproduction signal of a recorded mark through reproduction signals of other recorded marks adjacent to the recorded mark, is increased. At this time, since the multi-level has a large deviation σ, SDR is increased. Also, when recorded marks are handled by using high erasing power, it is impossible to avoid deterioration of some important characteristics if information is iteratively recorded. From this viewpoint, it is not preferable to increase the erasing power.

In order to suppress BER in the range of BER≦$10^{-3}$ for practical use, it is necessary to achieve SDR less than 3%. Then, it is necessary to set the laser power Pe/Pw between approximate 0.45 and approximate 0.7 as shown in FIG. 32. If the laser power Pe/Pw is set in this range, it is possible to form recorded marks whose multi-levels can be determined with accuracy. However, it is preferable to set the laser power Pe/Pw in the range 0.5≦Pe/Pw≦0.6.

The present invention is not limited to the specifically disclosed embodiments, and variations and modifications may be made without departing from the scope of the present invention.

The present application is based on Japanese priority applications No. 2002-073599 filed Mar. 18, 2002, No. 2002-112454 filed Apr. 15, 2002, No. 2002-246782 filed Aug. 27, 2002, No. 2002-307327 filed Oct. 22, 2002, No. 2002-326125 filed Nov. 8, 2002, No. 2002-374265 filed Dec. 25, 2002 and No. 2002-377213 filed Dec. 26, 2002, the entire contents of which are hereby incorporated by reference.

What is claimed is:

1. A multi-level information recording method for radiating a laser beam in an information recording medium and recording multi-level data in said information recording medium wherein a radiation energy level of said laser beam is controlled in accordance with said multi-level data, comprising the steps of:

recording a known multi-level data sequence by using said laser beam of a radiation energy level corresponding to a combination of multi-level data and obtaining a reproduction result for said combination;

performing a waveform equalizing process for said reproduction result;

computing a target signal level for each combination of said multi-level data by using a waveform equalizing coefficient;

computing a difference between said target signal level and a value obtained by performing said waveform equalizing process;

determining a correction amount of said laser beam for each combination of said multi-level data in accordance with said waveform equalizing coefficient and said difference; and determining a correction amount of said laser beam corresponding to said combination of the multi-level data, and wherein said waveform equalizing process is performed based on a formula (1), and said correction amount of the laser beam is determined based on a formula (2), $$EQ'(i) = s'(i) + \sum_{j=-h}^{h} Cj\{s'(i) - s'(i+j)\}, \quad (1)$$

and (2)

$$\Delta E(i) = \frac{\beta \cdot \Delta(i)(1 + \sum_{j=-h}^{h} Cj)}{(1 + 2\sum_{j=-h}^{h} |Cj|) \cdot \frac{ds'(i)}{dE(i)}},$$

where the number of taps of a waveform equalizer is 2h+1, EQ'(i) is a signal level after said waveform equalizing process, s'(i) is a reproduction signal level of i-th multi-level data, Cj is a waveform equalizing coefficient (j=−h, −(h−i), . . . , −1, 0, 1, . . . , h−1, h), β is a correction coefficient, Δ(i) is a difference between a target signal level and a result of the waveform equalizing process, and ds'(i)/dE(i) is a gradient of a curve of said reproduction signal level s'(i) to a laser beam energy E(i).

2. A multi-level information recording method for radiating a laser beam in an information recording medium and recording multi-level data in said information recording medium wherein a radiation energy level of said laser beam is controlled in accordance with said multi-level data, comprising the steps of:

recording a known multi-level data sequence by using said laser beam of a radiation energy level corresponding to a combination of multi-level data and obtaining a reproduction result for said combination;

performing a waveform equalizing process for said reproduction result;

computing a target signal level for each combination of said multi-level data by using a waveform equalizing coefficient;

computing a difference between said target signal level and a value obtained by performing said waveform equalizing process;

determining a correction amount of said laser beam for each combination of said multi-level data in accordance with said waveform equalizing coefficient and said difference; and determining a correction amount of said laser beam corresponding to said combination of the multi-level data, and wherein said waveform equalizing process is performed based on a formula (3), and said correction amount of the laser beam is determined based on a formula (4), $$EQ'(i) = s'(i) + \sum_{j=-h}^{h} Cj\{s'(i) - s'(i+j)\}, \quad (3)$$

and (4)

$$\Delta E(i) = \frac{\beta[1 + \sum_{j=-h}^{h} Cj\{\Delta(i) + \Delta(i+j)\}]}{(1 + 2\sum_{j=-h}^{h} |Cj|) \cdot \frac{ds'(i)}{dE(i)}},$$

where the number of taps of a waveform equalizer is $2h+1$, $EQ'(i)$ is a signal level after said waveform equalizing process, $s'(i)$ is a reproduction signal level of ith multi-level data, $C_j$ is a waveform equalizing coefficient ($j=-h, -(h-1), \ldots, -1, 0, 1, \ldots, h-1, h$), $\beta$ is a correction coefficient, $\Delta(i)$ is a difference between a target signal level and a result of the waveform equalizing process, and $ds'(i)/dE(i)$ is a gradient of a curve of said reproduction signal level $s'(i)$ to a laser beam energy $E(i)$.

3. The multi-level information recording method as claimed in claim 1, wherein said correction coefficient $\beta$ is determined as a value x that maximizes a formula (5), $$\Sigma\Delta^2(\beta=x|i)-\Sigma\Delta^2(\beta=0|i) \qquad (5),$$

where $\Sigma\Delta^2(\beta=0|i)$ is a sum of squares of differences between target signal levels and reproduction signal levels under initial radiation levels of said laser beam, and $\Sigma\Delta^2(\beta=x|i)$ a sum of squares of differences between target signal levels and reproduction signal levels after said initial radiation levels of said laser beam are updated once in a condition where $\beta=x$.

4. The multi-level information recording method as claimed in claim 2, wherein said correction coefficient $\beta$ is determined as a value x that maximizes a formula (6), $$\Sigma\Delta^2(\Delta=x|i)-\Sigma\Delta^2(\beta=0|i) \qquad (6),$$

where $\Sigma\Delta^2(\beta=0|i)$ is a sum of squares of differences between target signal levels and reproduction signal levels under initial radiation levels of said laser beam, and $\Sigma\Delta^2(\beta=x|i)$ a sum of squares of differences between target signal levels and reproduction signal levels after said initial radiation levels of said laser beam are updated once in a condition where $\beta=x$.

* * * * *